(12) United States Patent
Kaushal et al.

(10) Patent No.: US 8,078,552 B2
(45) Date of Patent: Dec. 13, 2011

(54) AUTONOMOUS ADAPTIVE SYSTEM AND METHOD FOR IMPROVING SEMICONDUCTOR MANUFACTURING QUALITY

(75) Inventors: Sanjeev Kaushal, San Jose, CA (US); Sukesh Janubhai Patel, Cupertino, CA (US); Kenji Sugishima, Tokyo (JP)

(73) Assignee: Tokyo Electron Limited, Tokyo (JP)

( * ) Notice: Subject to any disclaimer, the term of this patent is extended or adjusted under 35 U.S.C. 154(b) by 949 days.

(21) Appl. No.: 12/044,959

(22) Filed: Mar. 8, 2008

(65) Prior Publication Data

US 2009/0228408 A1  Sep. 10, 2009

(51) Int. Cl.
G06F 15/18 (2006.01)
(52) U.S. Cl. .................................................. 706/12
(58) Field of Classification Search .................. 706/12
See application file for complete search history.

(56) References Cited

U.S. PATENT DOCUMENTS

| | | | |
|---|---|---|---|
| 5,644,686 A | 7/1997 | Hekmatpour | |
| 5,867,799 A | 2/1999 | Lang et al. | |
| 6,122,397 A * | 9/2000 | Lee et al. | 382/149 |
| 7,127,304 B1 | 10/2006 | Gould et al. | |
| 7,133,804 B2 | 11/2006 | Tonack et al. | |
| 7,218,980 B1 | 5/2007 | Orshansky et al. | |
| 2003/0061212 A1 | 3/2003 | Smith et al. | |
| 2004/0254762 A1 | 12/2004 | Hopkins et al. | |
| 2005/0114829 A1 | 5/2005 | Robin et al. | |
| 2005/0144624 A1 | 6/2005 | Riosa et al. | |
| 2005/0288812 A1 | 12/2005 | Cheng et al. | |
| 2007/0005341 A1 | 1/2007 | Burges et al. | |
| 2007/0100487 A1 | 5/2007 | Cheng et al. | |
| 2007/0219738 A1 | 9/2007 | Weiher et al. | |
| 2007/0282767 A1 | 12/2007 | Cheng et al. | |
| 2007/0288419 A1 | 12/2007 | Strassner | |
| 2009/0138418 A1 | 5/2009 | Hidai et al. | |
| 2009/0240366 A1 | 9/2009 | Kaushal et al. | |

(Continued)

OTHER PUBLICATIONS

Shin et al., "A machine learning approach to yield management in semiconductor manufacturing", J. Prod. Res., 2000, vol. 38, No. 17, pp. 4261-4271.*

(Continued)

*Primary Examiner* — Jeffrey A Gaffin
*Assistant Examiner* — Li-Wu Chang
(74) *Attorney, Agent, or Firm* — Turocy & Watson, LLP

(57) ABSTRACT

An autonomous biologically based learning tool system and a method that the tool system employs for learning and analysis are provided. The autonomous biologically based learning tool system includes (a) one or more tool systems that perform a set of specific tasks or processes and generate assets and data related to the assets that characterize the various processes and associated tool performance; (b) an interaction manager that receives and formats the data, and (c) an autonomous learning system based on biological principles of learning. The autonomous learning system comprises a memory platform and a processing platform that communicate through a network. The network receives data from the tool system and from an external actor through the interaction manager. Both the memory platform and the processing platform include functional components and memories that can be defined recursively. Similarly, the one or more tools can be deployed recursively, in a bottom-up manner in which an individual autonomous tools is assembled in conjunction with other (disparate or alike) autonomous tools to form an autonomous group tool, which in turn can be assembled with other group tools to form a conglomerated autonomous tool system. Knowledge generated and accumulated in the autonomous learning system(s) associated with individual, group and conglomerated tools can be cast into semantic networks that can be employed for learning and driving tool goals based on context.

30 Claims, 21 Drawing Sheets

U.S. PATENT DOCUMENTS

2009/0271344 A1    10/2009    Schafer et al.

OTHER PUBLICATIONS

Kopetz, "The Real Time Environment" in Real-time systems: design principles for distributed embedded applications, (Kopetz), Kluwer, 2002, vol. 395, pp. 1-28.*

International Search Report & Written Opinion dated May 5, 2009 for PCT Application Serial No. PCT/US09/36149, 11 Pages.

"A Tutorial on Learning with Bayesian Networks", David Heckerman, Microsoft Technical Report MSR-TR-95-06, 1995.

"Learning Probabilistic Networks", Paul J Krause, Phillips Research Laboratory, Technical Report, 1998.

International Search Report and Written Opinion for PCT Application No. PCT/US09/36169, mailed Apr. 27, 2009, 10 Pages.

International Search Report & Written Opinion dated Mar. 18, 2010 for PCT Application Serial No. PCT/US10/23113, 11 Pages.

International Search Report & Written Opinion dated Apr. 12, 2011 for PCT Application Serial No. PCT/US1122997, 13 Pages.

* cited by examiner

AUTONOMOUS ADAPTIVE SYSTEM AND METHOD FOR IMPROVING SEMICONDUCTOR MANUFACTURING QUALITY

CROSS-REFERENCE TO RELATED APPLICATION

The subject application is related to co-pending, and commonly assigned, U.S. patent application Ser. No. 12/044,958, entitled "AUTONOMOUS BIOLOGICALLY BASED LEARNING TOOL," filed on Mar. 8, 2008. The entirety of this application is incorporated herein by reference.

BACKGROUND

Technological advances have lead to process-driven automated equipment that is increasingly complex. A tool system to accomplish a specific goal or perform a specific, highly technical process can commonly incorporate multiple functional elements to accomplish the goal or successfully execute the process, and various sensors that collect data to monitor the operation of the equipment. Such automated equipment can generate a large volume of data. Data can include substantial information related to a product or service performed as a part of the specific task, but it can also comprise sizable log information related to the execution of the process itself.

While modern electronic storage technologies can afford retaining constantly increasing quantities of data, utilization of the accumulated data remains far from optimal. Examination and interpretation of collected information generally requires human intervention, and while advances in computing power such as multiple-core processors, massively parallel platforms and processor grids, as well as advances in computing paradigms like object-oriented programming, modular code reuse, web based applications and more recently quantum computing, the processing of the collected data remains to be a non-autonomous, static programmatic enterprise wherein the data is operated upon. More importantly, in non-autonomous data processing, the data fails to drive the analysis process itself. As a consequence of such data processing paradigm, much of the rich relationships that can be present among data generated in automated equipment during a highly technical process can be unnoticed unless a specific analysis is designed and focused on a specific type of relationship. More importantly, emergent phenomena that can originate from multiple correlations among disparate data generated by disparate units in the equipment, and that can determine optimal performance of a complex automated tool or machine, can remain unnoticed.

Therefore, there is a need for automated equipment that is autonomous and can analyze data of a specific process, and on assets produced according to the specific process, consistently with a paradigm that is based on relationships among the data, and wherein the analysis of the data can be driven or affected by the data that surrounds the process or the associated asset themselves through learning, much like in the fashion that the human brain operates—understanding of information associated with an processes or asset is affected by the information itself, generally leading to learning and the ensuing revision of analysis goal(s), and analysis instrument(s) and approach(es) in order to improve the understanding of the information and the quality of an associated asset.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An autonomous biologically based learning tool system and a method that the tool system employs for learning are provided. The autonomous biologically based learning tool system includes (i) one or more tool systems that are either individual systems or hierarchically deployed group and conglomerated systems, which perform a specific task, e.g., a semiconductor manufacturing task, or process, such as oxide etching or ion implantation, and generates data that reflects the process and a tool performance, (ii) an interaction manager that receives data and packages the data for further utilization, and (iii) an autonomous learning system based on biological principles of learning; the learning implemented through spread activation of concepts in a set of semantic networks. The autonomous learning system comprises a functional structure that can be defined recursively from a group of three functional blocks: a memory platform, a processing platform, and a knowledge communication network, through which information is communicated among the memory and processing platforms, as well as the tool system and an external actor (e.g., a computer or a human agent). Memory platform includes a hierarchy of memories, including an episodic memory to receive data impressions and associated learning instructions, a short term memory that is employed for knowledge development, and a long term memory that stores knowledge, casting the knowledge into semantic networks. Functional units in the processing platform operate on the information stored in the memory platform, facilitating learning. Such building blocks and associated functionality are inspired by the biological structure and behavior of the human brain.

Learning is accomplished through concept activation in the defined semantic networks, with activation thresholds dictated through combination of priorities associated with each concept. Priorities depend on the type of concept that is manipulated; namely, a procedural concept possesses a priority based on activation and inhibition energies.

Individual, group or conglomerate autonomous tool systems exploit the knowledge that is generated and accumulated in the autonomous learning system, which leads to multiple improvements in the autonomous biologically based learning tool as well as on assets fabricated by the various tool systems: (a) increased independence leading to lesser actor intervention (e.g., human direction and supervision) as time progresses, (b) increased production performance of outputs (e.g., output assets at least partially finished) and ensuing higher quality of the outputs, (c) data assets that convey actionable information to actors (e.g.; status of autonomous system degradation; better identification of root causes of failures; prediction of a set of system time-to-failure for individual parts, tools, tool groups and conglomerated tool, as well as associated time scales such as mean time between failures and mean time to repair), and (c) enhanced performance over time-improved products or services are delivered at a faster rate, with fewer resources consumed, and are produced with reduced tool down time.

To the accomplishment of the foregoing and related ends, the following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and novel features of the claimed subject matter will become apparent from the following detailed description of the claimed subject matter when considered in conjunction with the drawings.

DETAILED DESCRIPTION OF THE DRAWINGS

Figure 18:
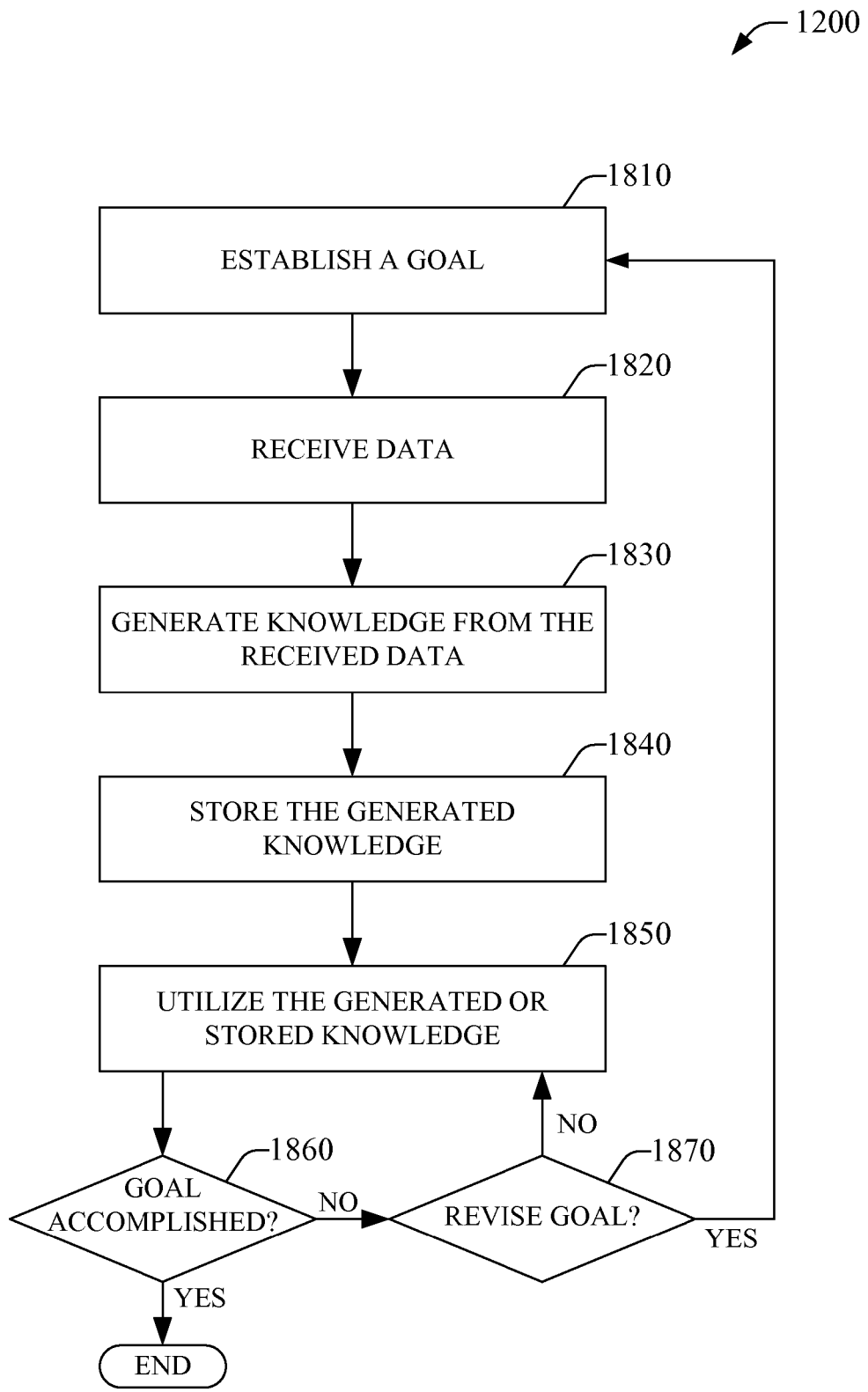

FIG. 18 presents a flowchart of an example method for biologically based autonomous learning according to aspects described herein.

Figure 19:
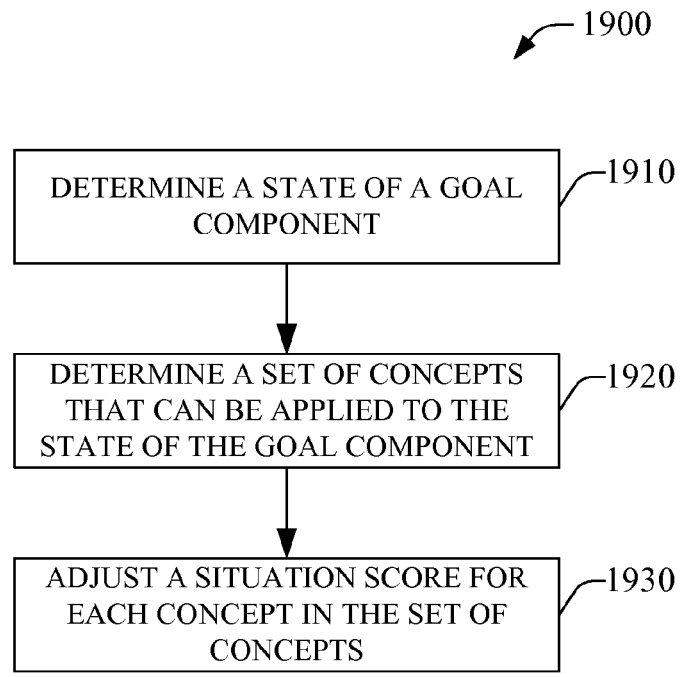

FIG. 19 presents a flowchart of an example method for adjusting a situation score of a concept according to an aspect described in the subject specification.

Figure 20:
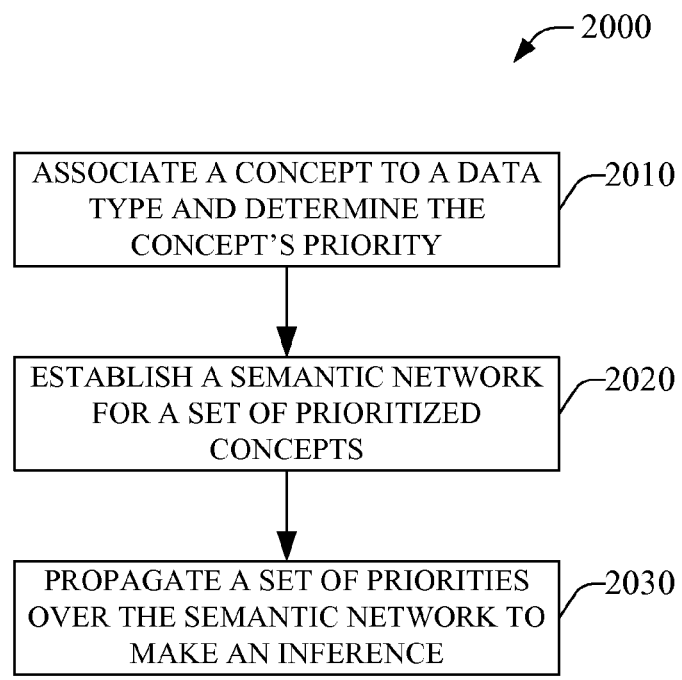

FIG. 20 presents a flowchart of an example method for generating knowledge in accordance with an aspect set forth herein.

Figure 21:
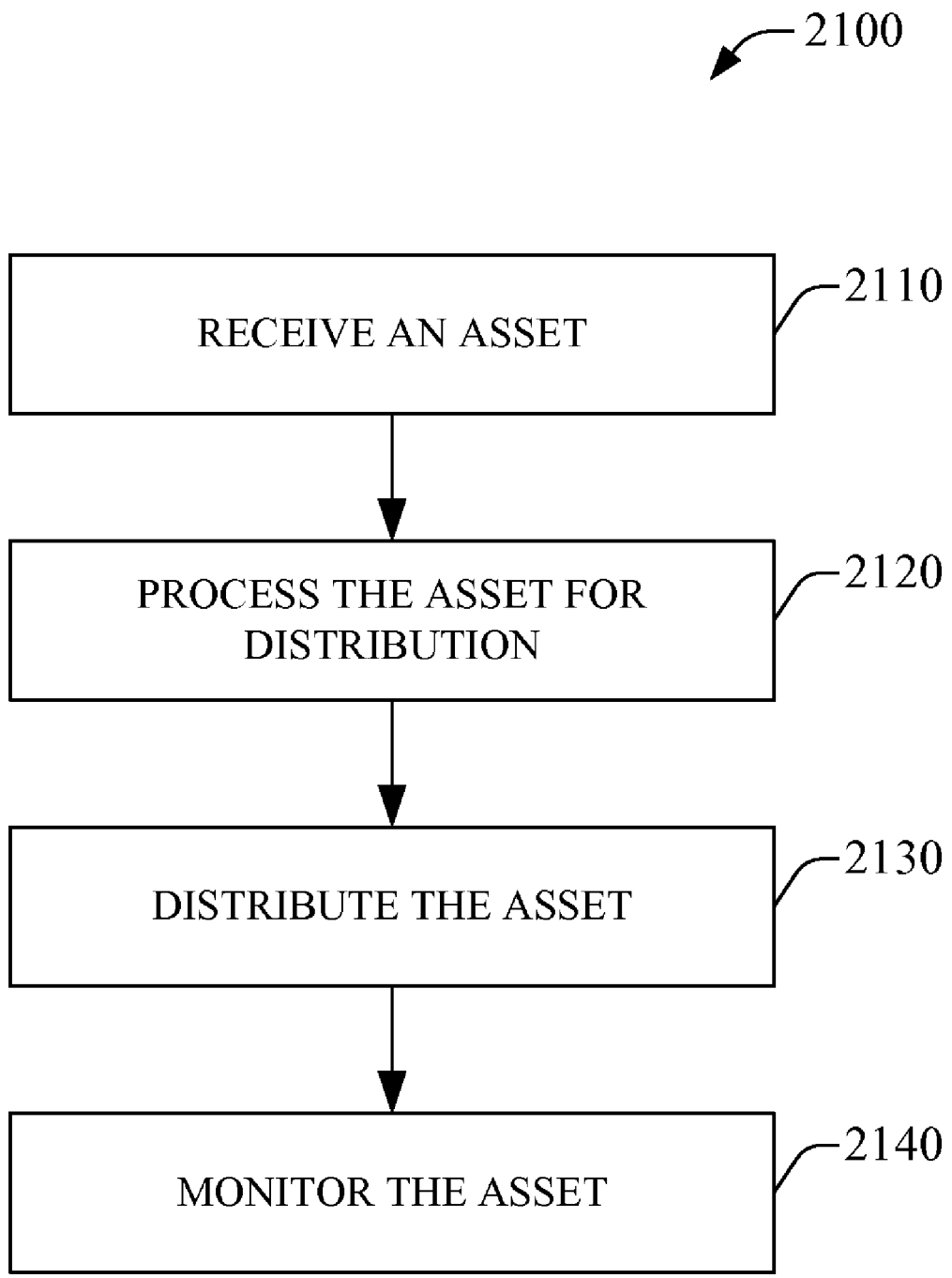

FIG. 21 presents a flowchart of an example method for asset distribution according to aspects disclosed herein.

DETAILED DESCRIPTION

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present innovation.

As used in the subject specification, the terms "object," "module," "interface," "component," "system," "platform," "engine," "unit," "store," and the like are intended to refer to a computer-related entity or an entity related to an operational machine with a specific functionality, the entity can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 1:
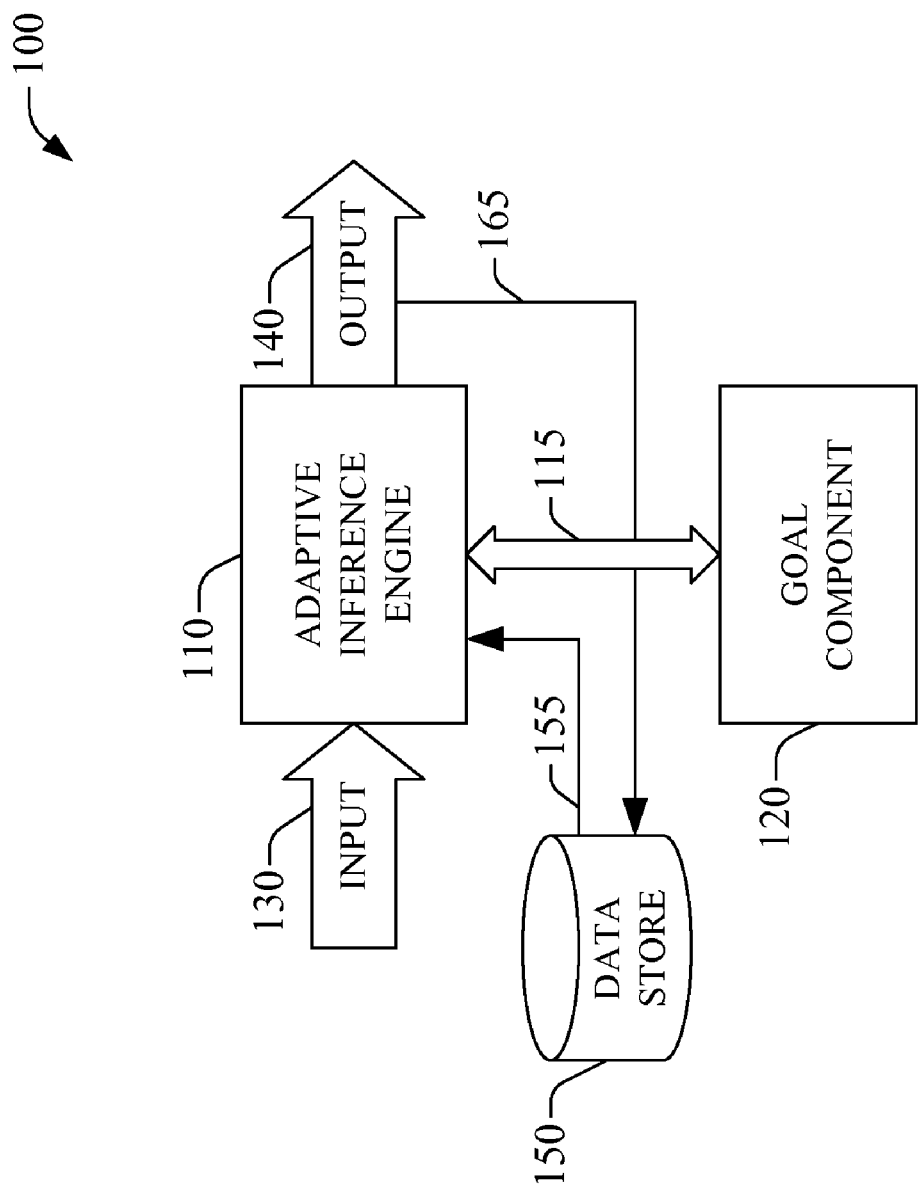
FIG. 1 illustrates a high level block diagram of an autonomous biologically based learning tool.

Referring to the drawings, FIG. 1 illustrates an example autonomous biologically based learning system 100. An adaptive inference engine 110 is coupled to a goal component 120. A wired or wireless communication link 115 couples such components. For a specific goal established or pursued by goal component 120, adaptive inference component 110 receives an input 130 that can be employed to accomplish the goal and conveys output 140 that can represent or record aspects of the pursued or accomplished goal. In addition, adaptive inference engine 110 can receive data from a data store 150 through link 155, and can store data or information in such data store, e.g., stored information can be a portion of output 140 that is conveyed through a wired or wireless link 165. It should be appreciated that (i) input 130, output 140, and data in data store 150 (as well as the history of input, output, and data in the data store) comprise a context for the operation of adaptive inference engine 110, and (ii) a feedback of that context into the engine via links 115, 155, and 165 facilitates adaptation based on context. In particular, goal component 120 can exploit fed back context to adapt a specific, initial goal and thus establish and pursue the adapted goal.

Input 130 can be regarded as extrinsic data or information, which can include (1) sounds, e.g., voice commands, environment noises or voices, alarms; (2) images captured by a static or mobile earth-based camera, or an airborne (e.g., plane, satellite) camera, wherein cameras can operate in multiple intervals of the radiation spectrum; (3) biometric indicators; (4) tokens such as batches of manufactured products, samples of materials; data which can include instructions, records, results of measurements; and so on. Output 140 can be substantially the same in nature as input 130, and it can be regarded as intrinsic data. Input and output 140 can be received and conveyed, respectively, by input and output interfaces, e.g., cameras, input pads, media docks (e.g., USB ports, IR wireless inputs), that can reside in adaptive inference component 110. As indicated above, input 130 and output 140 can be a portion of a context for adaptive inference engine 110. Additionally, adaptive inference component 110 can request input 130 as a result of pursuing a goal.

Components in autonomous biologically based system 100 can be defined recursively, which can confer the autonomous system 100 a substantial degree of competent learning complexity with basic elementary components.

Each link 115, 155, or 165 can include a communication interface that can facilitate manipulation of data or information to be transmitted or received; can utilize databases for data storage and data mining; and can receive and convey information from and to an actor. Wired embodiments of links 115, 155, or 165 can include a twisted-pair line, a T1/E1 phone line, an AC line, an optical fiber line, and corresponding circuitry, whereas wireless embodiments can comprise an ultra-mobile wide band link, a long-term evolution link, or an IEEE 802.11 link, and associated electronics. Regarding data store 150, although it is illustrated as a single element, it can be a distributed data warehouse, wherein set of data memories are deployed in disparate physical or logical locations In example system 100, the adaptive inference engine 110 and the goal component 320 are illustrated as separate components, however, it should be appreciated that one of such components can reside within the other.

Goal component 120 can belong to one or more disciplines (e.g., a scientific discipline, a commercial discipline, an artistic discipline, a cultural discipline, and so on) or enterprise sectors (e.g., a market sector, an industry sector, a research sector, energy sector, public policy sector, and so on). Additionally, as goals can typically be multidisciplinary and focus on multiple markets, a goal component can establish multiple disparate goals within one or more particular disciplines or sectors. To pursue a goal, a goal component can comprise a functional component and a monitor component. Specific operations to accomplish a goal are effected through the functional component(s), whereas conditions of variables related to the accomplishment of the goal are determined by the monitor component. Additionally, the functional component(s) can determine a space of goals that can be accomplished by the goal component 120. A space of goals comprises substantially all goals that can be attained with a specific functionality. It should be appreciated that, for such specific functionality afforded by a functional component, a contextual adaptation of a specific goal can adapt a first goal to a second goal within a space of goals. An initial goal within a space of goals can be determined by one or more actors; wherein an actor can be a machine or a human agent (e.g., an end user). It should be noted that an initial goal can be a generic, high-level objective, as the adaptation inference engine 110 can drive goal component 120 towards a complex detailed objective through goal drifting. Goals, goal components and goal adaptation are illustrated next.

Figure 2:
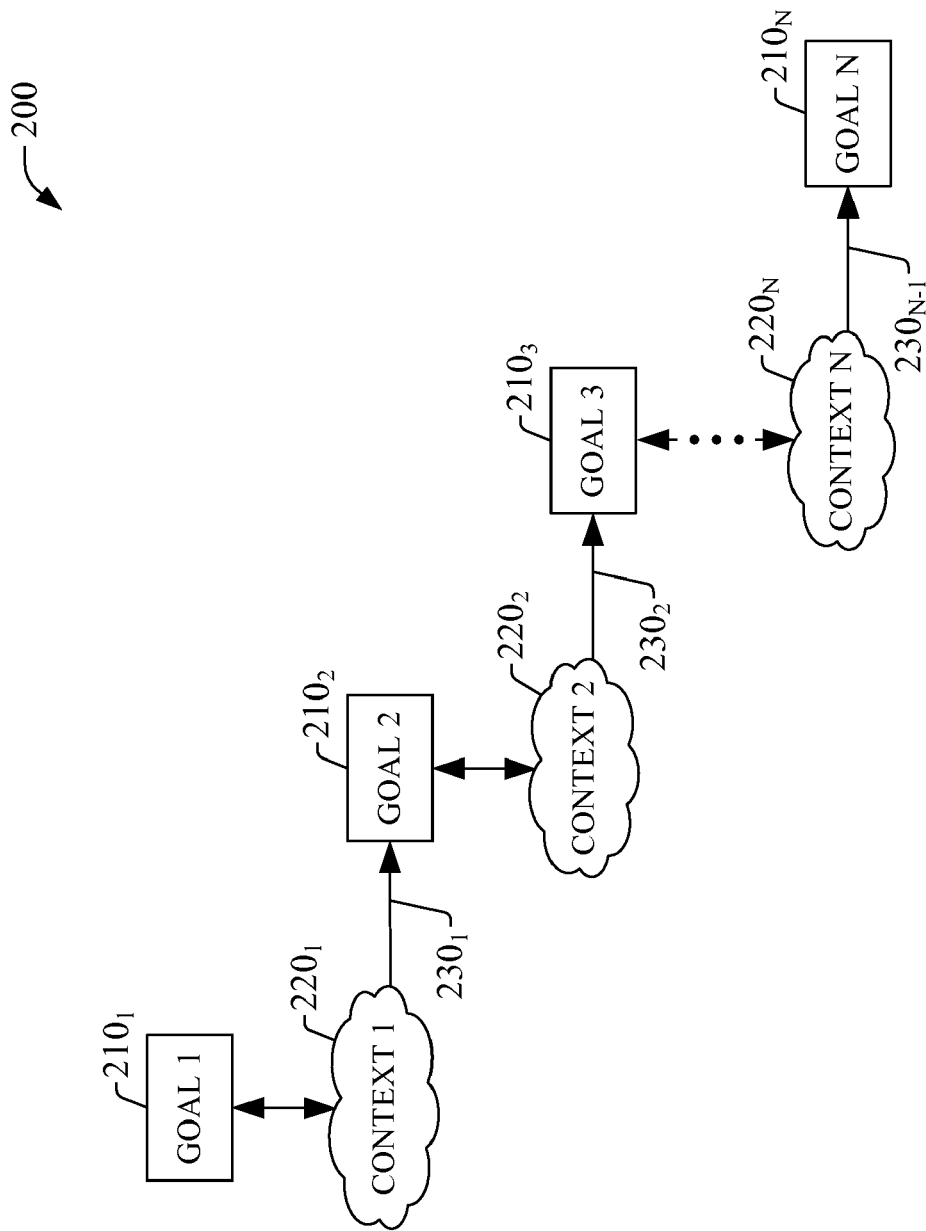
FIG. 2 is a diagram that delineates contextual goal adaptation according to aspects described herein.

FIG. 2 is a diagram 200 that delineates contextual goal adaptation. A goal (e.g., goal $210_1$, or goal $210_3$) can typically be an abstraction that is associated with the functionality of a goal component (e.g., component 120). A goal can be a high level abstraction: "Save for retirement," "secure a profit," "be entertained," "learn to cook," "to travel to a locale," "develop a database," "manufacture a product," and so on. Additionally, goals can be more specific refinements such as "save to retire early with an annual income in the range of $60,000-$80,000," "travel from the United States to Japan in low season, with travel costs including housing not to exceed $5000," or "reach a job interview site to deliver a 35 minute presentation to a group of associates of the prospective employer." Furthermore, a goal (e.g., $210_1$) possesses an associated context (e.g., $220_1$). As indicated above, goal component 120 coupled to adaptive inference engine 110 generally is compatible with an established goal (e.g., goal $210_1$, or goal $210_3$). For instance, the goal "manufacture a product" (e.g., goal $210_1$) can rely on a manufacturing tool system such as a molecular beam epitaxy reactor (an example goal component 120) that adopts standard or custom specifications to manufacture the product. During the accomplishment of such a goal (e.g., goal $210_1$), output 140 can include the manufactured product. In addition, an adaptive inference component (e.g., component 110) can adapt (e.g., adaptation $230_1$) the "manufacture a product" goal (e.g., goal $210_1$) based on context (e.g., context $220_1$) like the one that can be generated by tool system specifications or data gathered by a monitor component in the goal component. In particular, the initial high-level goal (e.g., goal $210_1$) can be adapted to "manufacture a semiconductor device" (e.g., goal $210_2$). As indicated above, a goal component 120 can be composed of multiple functional components in order to accomplish a goal. Additionally, goal component 120 can be modular, wherein goal subcomponent can be incorporated as a goal is adapted. As an example, a goal component that pursues the "manufacture a product" goal can comprise a multi-market evaluation and forecast component that is coupled to a massively parallel, intelligent computing platform which can analyze market conditions in various markets in order to adapt (e.g., $230_1$) the goal to "manufacture a multicore-processor that utilizes molecular electronics components" (e.g., goal $210_N$). It should be noted that such an adaptation can involve a number of intermediate adaptations $230_1$-$230_{N-1}$, as well as intermediate adapted goals $210_2$-$210_{N-1}$ wherein intermediated adaptation is based on intermediate contexts $220_2$-$220_N$ generated from a previously pursued goals.

In another illustration of goal, goal component and goal adaptation, a goal can be to "purchase a DVD of movie A at store B," the goal component 120 can be a vehicle with a navigation system that comprises an adaptive inference engine 110. (It should be noted that in this illustration the adaptive inference engine 110 resides in the goal component 120.) An actor (e.g., a vehicle operator) can enter or select the location of store B and goal component can generate directions to accomplish the goal. In the instance that the adaptive inference engine 110 receives input 130 that store B has ceased to carry in inventory movie A (e.g., an RFID reader has updated an inventory database and an update message has been broadcasted to component 110) while the actor is traveling to the store, adaptive inference engine 110 can (i) request additional input 330 to identify a store C with movie A in stock, (ii) evaluate the resources available to the actor to reach store C, and (iii) assess the level of interest of the actor in accomplishing the goal. Based on the modified context developed through input 130 as illustrated in (i)-(iii), goal component can receive an indication to adapt the goal "to purchase a DVD of movie A at store C."

It should be appreciated that adaptive inference engine 110 can establish sub-goals associated with a goal determined by goal component 120. A sub-goal can facilitate accomplishing the goal by enabling adaptive inference engine to accomplish complementary task or to learn concepts associated with the goal.

As a summary, autonomous biologically based system 100 is a goal-driven system with contextual goal-adaptation. It should be appreciated that goal adaptation based on received context introduces an additional layer of adaptation to the analysis of input information to generate actionable information output 140. The capabilities of (a) adapting the process of information or data analysis and (b) adapting an initial goal based on context render the system massively adaptive or autonomous.

Figure 3:
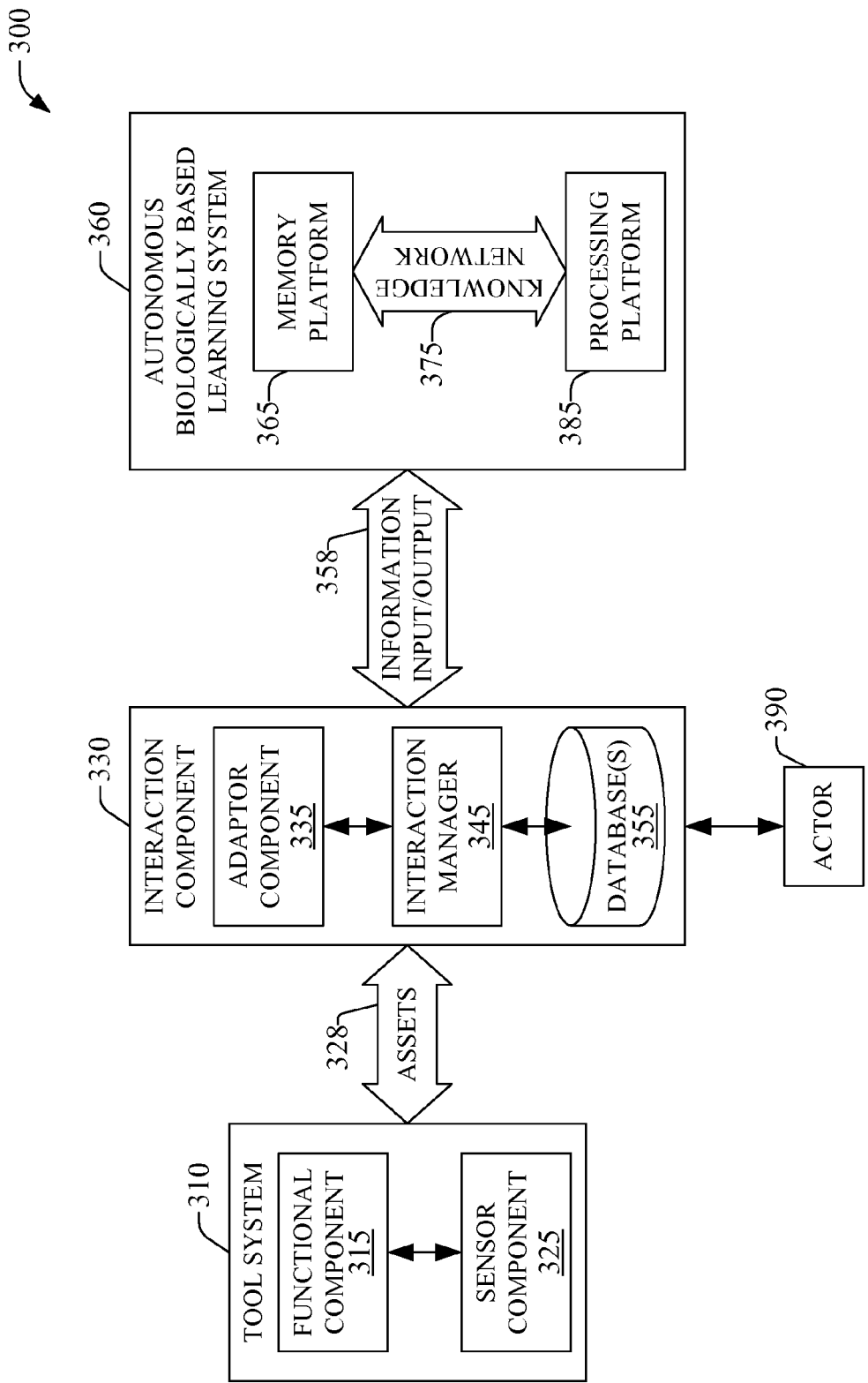
FIG. 3 illustrates a high level block diagram of an example autonomous biologically based learning tool.

FIG. 3 illustrates a high level block diagram of an example autonomous biologically based learning tool 300. In embodiment 300, the autonomous learning system includes a tool system 310 that comprises a functional component 315 which confers the tool system its specific functionality and can comprise a single functional tool component or a collection of substantially identical or diverse functional tool components, and a sensor component 325 that can probe several observable magnitudes related to a process performed by the tool, like a thermal treatment of a semiconductor wafer, and generates assets 328 associated with the process. Collected assets 328, which include data assets such as production process data or test run data, can be conveyed to an interaction component 330 which includes an adaptor component 335 that can serve as an interface to receive assets 328, an interaction manager 345 which can process the received assets 328, and database(s) 355 that can store the received and processed data. Interaction component 330 facilitates interaction of tool system 310 with autonomous biologically based learning system 360. Information associated with the data generated in the process performed by tool system 310 which can be received and incrementally supplied to autonomous learning system 360.

Autonomous biologically based learning system 360 includes a memory platform 365 that stores received information 358 (e.g., data, variables and associated relationships, causal graphs, templates, and so on) which can be communicated via a knowledge network 375 to a processing platform 385 that can operate on the received information, and can communicate back a processed information through the knowledge network 375 to the memory platform 365. The constituent components of autonomous learning system 360 can generally resemble biological aspects of the brain, in which a memory is networked with processing components to manipulate information and generate knowledge. Additionally, knowledge network 375 can receive information from, and convey information to, interaction component 330, which can communicate the information to tool system 310, or an actor 390 via interaction manager 345. As information 358 is received, stored, processed and conveyed by the autonomous learning system 360, multiples improvements can be effected in tool system 310 and actors that rely on it. Namely, improvements include (a) the autonomous learning system 360 and tool system 310 become increasingly independent as time progresses, and require lesser actor intervention (e.g., human direction and supervision), (b) the autonomous system improves the quality of its outputs to actors (for example, better identification of root causes of failures, or prediction of system failure before occurrence thereof), and (c) the autonomous learning system 360 improves its performance over time—the autonomous system 360 delivers improved results at a faster rate and with fewer resources consumed.

Memory platform 365 comprises a hierarchy of functional memory components, which can be configured to store knowledge (e.g., information 358) received during initialization or configuration of tool system 310 (e.g., a priori knowledge). A priori knowledge can be conveyed as information input 358 through the interaction component 330. In addition, memory platform 365 can store (a) training data (e.g., information input 358) employed to train the autonomous learning system 360 after initialization/configuration of tool system 310, and (b) knowledge generated by the autonomous learning system 360; the knowledge can be conveyed to tool system 310 or actor 390 through interaction component 330, via interaction manager 345.

Information input 358 (e.g., data) supplied by an actor 390, e.g., a human agent, can comprise data identifying a variable associated with a process, a relationship between two or more variables, a causal graph (e.g., a dependency graph), or an episode information. Such information can facilitate to guide the autonomous biologically based system 360 in a learning process. Additionally, in one aspect, such information input 358 can be deemed important by actor 390, and the importance can be related to the relevance of the information to a specific process performed by tool system 310. For instance, an operator (e.g., actor 390 is a human agent) of an oxide etch system can determine that etch rate is critical to the outcome of the manufacturing process; thus, etch rate can be an attribute communicated to autonomous learning system 360. In another aspect, information input 358 supplied by actor 390 can be a hint, whereby an indication to learn a particular relationship among process variables is made. As an example, hint can convey a suggestion to learn the behavior of pressure in a deposition chamber in tool system 310, within a specific deposition step, as a function of chamber volume, exhaust pressure and incoming gas flow. As another example, a hint can indicate to learn a detailed temporal relationship for a chamber pressure. Such example hints can activate one or more functional processing units in the autonomous learning system that can learn the functional dependence of pressure on multiple process variables. Moreover, such hints can activate one or more functional units that can apply and compare a learnt functionality with respect to model or empirical functionalities available to actor 390.

A tool system 310, e.g., a semiconductor manufacturing tool, can be complex and therefore disparate actors can specialize in manipulating and operating the tool system through disparate types of specific, complete or incomplete knowledge. As an example, a human agent, e.g., a tool engineer can know that different gases have different molecular weight and thus can produce different pressures, whereas a process/tool engineer can know how to convert a pressure reading resulting from a first gas to an equivalent pressure resulting from a second gas; an elementary example of such knowledge can be to convert a pressure reading from a unit (e.g., Pa) to another (e.g., $lb/in^2$, or PSI). An additional type of general, more complex knowledge present in the autonomous biologically based learning system can be functional relationships between properties of a tool system (e.g., volume of a chamber) and measurements performed in the tool system (e.g., measured pressure in the chamber). For example, etch-engineers know that the etch rate is dependent on the temperature in the etch chamber. To allow for the diversity of knowledge and the fact that such knowledge can be incomplete, an actor (e.g., a human agent such as an end-user) can guide an autonomous learning system 360 through multiple degrees of conveyed knowledge: (i) No knowledge specified. Actor delivers no guidance for the autonomous learning system. (ii) Basic knowledge. Actor can convey a valid relationship between properties of a tool system and measurements in the tool system; for instance, actor conveys a relationship (e.g., relationship ($\kappa_E$, T)) between an etch rate ($\kappa_E$) and process temperature (T) without further detail. (iii) Basic knowledge with identified output. Further to a relationship between a tool system property and a tool system measurement, actor can provide specific output for a dependent variable in a relationship (e.g., relationship(output($\kappa_E$), T). (iv) Partial knowledge about a relationship. Actor knows the structure of a mathematical equation among a tool system property and a measurement, as well as relevant dependent and independent variables (e.g., $\kappa_E = k_1 e^{-k2/T}$ without concrete values for $k_1$ or $k_2$). The actor, however, can fail to know a precise value of one for more associated constants of the relationship. (v) Complete knowledge. Actor possesses a complete mathematical description of a functional relationship. It should be noted that such guidance can be incrementally provided over time, as the autonomous learning system 360 evolves and attempts to learn tool functional relationships autonomously.

Knowledge network 375 is a knowledge bus that communicates information (e.g., data) or transfers power according to an established priority. The priority can be established by a pair of information source and information destination components or platforms. Additionally, priority can be based on the information being transmitted (e.g., this information must be dispatched in real-time). It should be noted that priorities can be dynamic instead of static and change as a function of learning development in the autonomous learning system 360, and in view of one or more demands in the one or more components present in the autonomous biologically based learning tool 300—e.g., a problem situation can be recognized and a communication can be warranted and effected in response. Communication, and power transfer, via knowledge network 375 can be effected over a wired link (e.g., a twisted pair link, a T1/E1 phone line, an AC line, an optical fiber line) or a wireless link (e.g., UMB, LTE, IEEE 802.11), and can occur among components (not shown) within a functional platform (e.g., memory platform 365 and processing platform 385) or among components in disparate platforms (e.g., a component in memory platform of self-awareness communicating with another sub-component of self-awareness) or the communication can be between components (e.g., a component of awareness communicates with a component in conceptualization).

Processing platform 385 comprises functional processing units that operate on information: Input information of a specific type (e.g., specific data types such as a number, a sequence, a time sequence, a function, a class, a causal graph, and so on) is received or retrieved and a computation is performed by a processing unit to generate output information of a specific type. Output information can be conveyed to one or more components in memory platform 365 via knowledge network 375. In an aspect, the functional processing units can read and modify data structures, or data type instance, stored in memory platform 335, and can deposit new data structures therein. In another aspect, functional processing units can provide adjustments to various numeric attributes like suitability, importance, activation/inhibition energy, and communication priority. Each functional processing unit has a dynamic priority, which determines a hierarchy for operating on information; higher priority units operate on data earlier than lower priority units. In case a functional processing unit that has operated on specific information fails to generate new knowledge (e.g., learn), like generating a ranking number or ranking function that distinguishes a bad run from a good run associated with operation of a tool system 310, the priority associated with the functional processing unit can be lowered. Conversely, if new knowledge is generated, the processing unit's priority is increased.

It should be appreciated that processing platform 385, through prioritized functional processing units, emulates a human tendency to attempt a first operation in a specific situation (e.g., a specific data type), if the operation generates new knowledge, the operation is exploited in a subsequent substantially identical situation. Conversely, when the first operation fails to produce new knowledge, a tendency to employ the first operation to handle the situation is reduced and a second operation is utilized (e.g., spread activation). If the second operation fails to generate new knowledge, its priority is reduced, and a third operation is employed. Processing platform 385 continues to employ an operation until new knowledge is generated, and another operation(s) acquire higher priority.

In an aspect, actor 390 can provide process recipe parameters, instructions (e.g., a temperature profile for an annealing cycle of an ion implanted wafer, a shutter open/close sequence in a vapor deposition of a semiconductor, an energy of an ion beam in an ion implantation process, or an electric field magnitude in a sputtering deposition), as well as initialization parameters for the autonomous learning system 360. In another aspect, an actor can supply data associated with maintenance of tool system 310. In yet another aspect, actor 390 can generate and provide results of a computer simulation of the process performed by tool system 310. Results generated in such a simulation can be employed as training data to train the autonomous biologically based learning system. Additionally, a simulation or an end-user can deliver optimization data associated with a process to tool system 370.

Autonomous learning system 360 can be trained through one or more training cycles, each training cycle can be utilized to develop the autonomous biologically based learning tool 300 to (i) be able to perform a larger number of functions without external intervention; (ii) provide better response such as improved accuracy, or correctness, when diagnosing root cause of manufacturing system health root causes; and (iii) increase performance such as faster response time, reduced memory consumption, or improved quality of product. Training data can be supplied to the autonomous learning system via adaptor component 335, in case training data is collected from data 328 associated with a process calibration or standard run in tool system 310—such data can be deemed to be internal—or through interaction manager 345. When training data is retrieved from database(s) 365 (e.g., data related to external measurements conducted through an external probe, or records of repair intervention in tool system 310); such training data can be deemed external. When training data is supplied by an actor, data is conveyed through interaction manager 345 and can be deemed external. A training cycle based on internal or external training data facilitates autonomous learning system 360 to learn an expected behavior of tool system 310.

As indicated above, functional component 315 can comprise multiple functional tool components (not shown) associated with the tool specific semiconductor manufacturing capabilities and that enable the tool to be used to (a) manufacture semiconductor substrates (e.g., wafers, flat panels, liquid crystal displays (LCDs), and so forth), (b) conduct epitaxial vapor depositiontion or non-epitaxial vapor deposition, (c) facilitate ion implantation or gas cluster ion infusion, (d) perform a plasma or non-plasma (dry or wet) an oxide etch treatment, (e) implement a lithographic process (e.g., photolithography, e-beam lithography, etc.), and so on. The tool system 310 can also be embodied in a furnace; an exposure tool for operation in a controlled electrochemical environment; a planarization device; an electroplating system; a test device for optical, electrical, and thermal properties, which can included lifespan (through operation cycling) measurements; a metrology tool, a wafer cleaning machine, and the like.

In the process conducted by tool system 310, sensors and probes comprising sensor component 325 can collect data (e.g., data assets) on different physical properties (e.g., pressure, temperature, humidity, mass density, deposition rate, layer thickness, surface roughness, crystalline orientation, doping concentration, etc.) as well as mechanical properties (valve aperture or valve angle, shutter on/off operation, gas flux, substrate angular velocity, substrate orientation, and the like) through various transducers and techniques with varying degrees of complexity depending on the intended use of the gathered data. Such techniques can include, but are not limiting to including, X-ray diffraction, transmission electron microscopy (TEM), scanning electron microscopy (SEM), mass spectrometry, light-exposure assessment, magnetoelectric transport measurements, optical properties measurements, and so on. Additional data assets that are relevant to a product (e.g., a semiconductor substrate) are development inspection (DI) critical dimension (CD), and final inspection (FI) CI. It should be appreciated that probes can be external to tool system 310 and can be accessed through an interface component (not shown). For instance, such external probes can provide DI CI and FI CI. It should be appreciated that such data assets 328 effectively characterize output assets, or physical products manufactured or fabricated by tool system 310.

In an aspect, data sources in sensor component 325 can be coupled to adaptor component 335, which can be configured to gather data assets 328 in analog or digital form. Adaptor component 335 can facilitate data 368 collected in a process run to be composed or decomposed according to the intended utilization of the data in autonomous learning system 310 before the data is deposited into memory platform 365. Adaptors in adaptor component 335 can be associated with one or more sensors in sensor component 325 and can read the one or more sensors at specific frequencies, or in other specific conditions. An external data source adapter may have the ability to pull data as well as pass through data that is pushed from outside the tool. For example, an MES/historical database adaptor knows how to consult an MES database to extract information for various autobots and package/deposit the data into working memory for one or more components of the autonomous system. As an example, adaptor component 335 can gather wafer-level run data one wafer at a time as the tool processes the wafer. Then, adaptor component 335 can consolidate individual runs in a batch to form "lot-level-data," "maintenance-interval-data", etc. Alternatively, if tool system 310 outputs a single file (or computer product asset) for lot-level data, adaptor component 335 can extract wafer-level data, step-level data, and the like. Furthermore, decomposed data elements can relate to one or more components of tool system 300; e.g., variables and times at which a pressure controller in sensor component 325 is operating. Subsequent to processing, or packaging, received data 328 as described above, adaptor component 335 can store processed data in database(s) 355.

Database(s) 355 can include data originated in (i) tool system 370, through measurements performed by sensors in sensor component 325, (ii) a manufacturing execution system (MES) database or a historical database, or (iii) data generated in a computer simulation of tool system 310, e.g., a simulation of semiconductor wafer manufacturing performed by actor 390. In an aspect, an MES is a system that can measure and control a manufacturing process, can track equipment availability and status, can control inventory, and can monitor for alarms.

It is to be appreciated that products, or product assets, fabricated by tool system 310 can be conveyed to actor 390 through interaction component 330. It should be appreciated that product assets can be analyzed by actor 390 and the resulting information, or data assets, conveyed to autonomous learning system 360. In another aspect, interaction component 330 can perform analysis of a product asset 328 via adaptor component 335.

In addition it is to be noted that in embodiment 300 the interaction component 340 and autonomous learning system 360 are externally deployed with respect to tool system 310. Alternative deployment configurations of autonomous biologically based learning tool 300 can be realized, such as embedded deployment wherein interaction component 340 and autonomous biologically based learning system 310 can reside within tool system 370, in a single specific tool component; e.g., single embedded mode, or in a cluster of tool components; e.g., multiple embedded mode. Such deployment alternatives can be realized in a hierarchical manner, wherein an autonomous learning system supports a set of autonomous learning tools that form a group tool, or a tool conglomerate. Such complex configurations are discussed in detail below.

Next, an illustrative tool system 310 is discussed in connection with FIG. 4, and an example architecture for the autonomous biologically based learning system 360 is presented and discussed in detail with respect to FIGS. 5-9.

Figure 4:
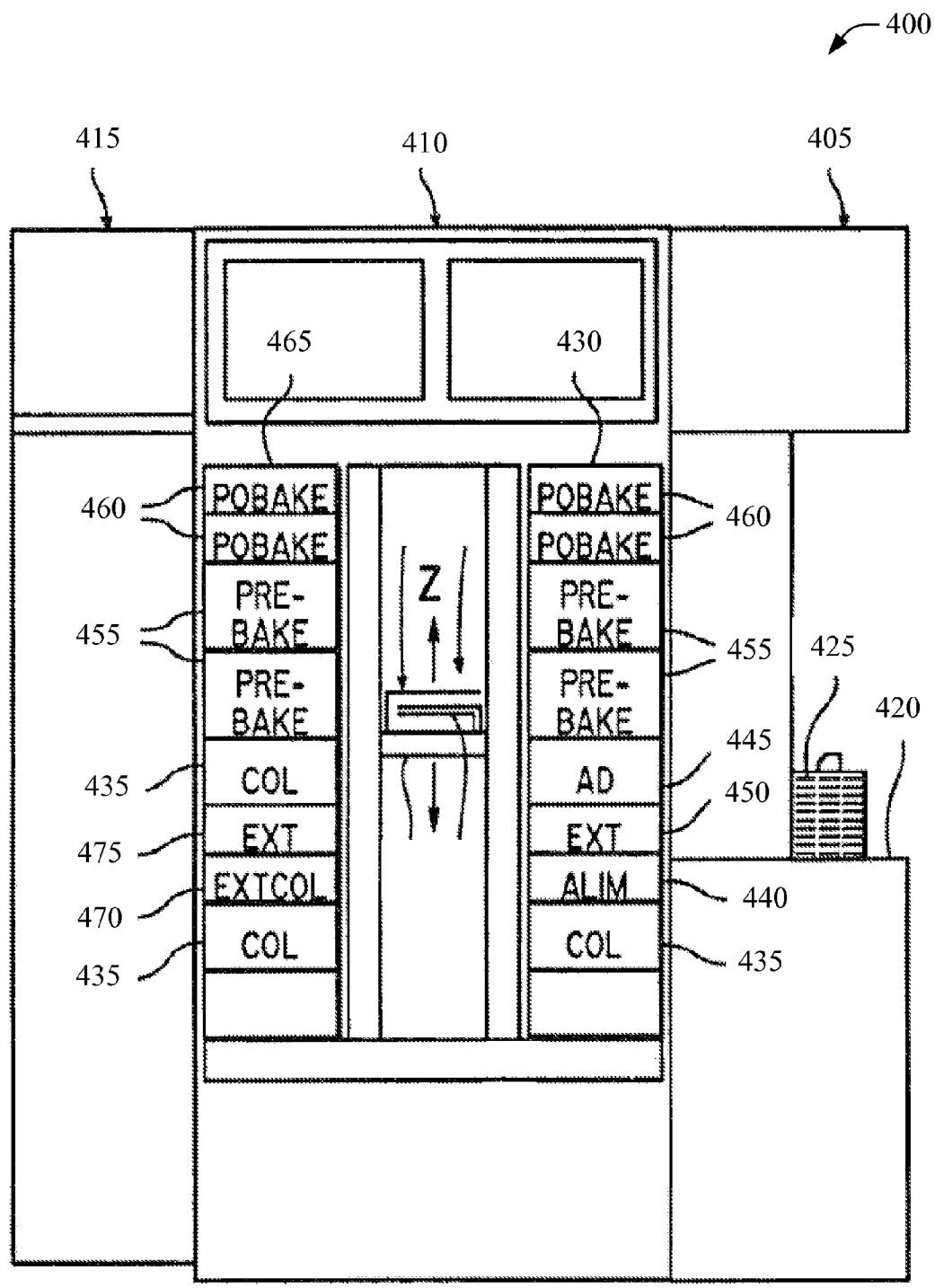
FIG. 4 is a diagram of an example tool system for semiconductor manufacturing that can exploit an autonomous biologically based learning system.

FIG. 4 is a diagram of an example semiconductor manufacturing system 400 that can exploit an autonomous biologically based learning system 360 to monitor, analyze, and improve operation. In particular, system 400 is a thermal development and coating system that illustrates a tool system 310 discussed above in connection with FIG. 3. The system 400 includes a load/unload section 405, a process section 410, and an interface section 415. In an aspect the load/unload section 405 has a cassette table 420 on which cassettes 425 each storing a plurality of semiconductor substrates are loaded into and unloaded from the system 400. The process section 410 has various single substrate processing units for processing substrates sequentially one by one. The interface section 415 can facilitate access to multiple probes and sensors for quality assurance, process development, in situ root cause analysis. Collected data (e.g., data 368) can be conveyed to the autonomous biologically based learning system, through an interface component.

In an aspect, process unit 410 comprises a first process unit group 430 which possesses a cooling unit (COL) 435, an alignment unit (ALIM) 440, an adhesion unit (AD) 445, an extension unit (EXT) 450, two prebaking units (PREBAKE) 455, and two postbaking units (POBAKE) 460, which are stacked sequentially from the bottom. Additionally, a second process unit group 465 includes a cooling unit (COL) 435, an extension-cooling unit (EXTCOL) 470, an extension unit (EXT) 475, a second cooling unit (COL) 435, two prebaking units (PREBAKE) 455 and two postbaking units (POBAKE) 460, Cooling unit (COL) 435 and the extension cooling unit (EXTCOL) 470 may be operated at low processing temperatures and arranged at lower stages, and the prebaking unit (PREBAKE) 455, the postbaking unit (POBAKE) 460 and the adhesion unit (AD) 445 are operated at high temperatures and arranged at the upper stages. With this arrangement, thermal interference between units can be reduced. Alternatively, these units can have alternative or additional arrangements. The prebaking unit (PREBAKE) 455, the postbaking unit (POBAKE) 460, and the adhesion unit (AD) 445 each comprise a heat treatment apparatus in which substrates are heated to temperatures above room temperature. In an aspect, temperature and pressure data can be supplied to the autonomous biologically based learning system 360 through interface component 340, from prebaking unit 455, postbaking unit 460, and adhesion unit 445. Rotational speed and positional data for a substrate can be conveyed from alignment unit 440.

Figure 5:
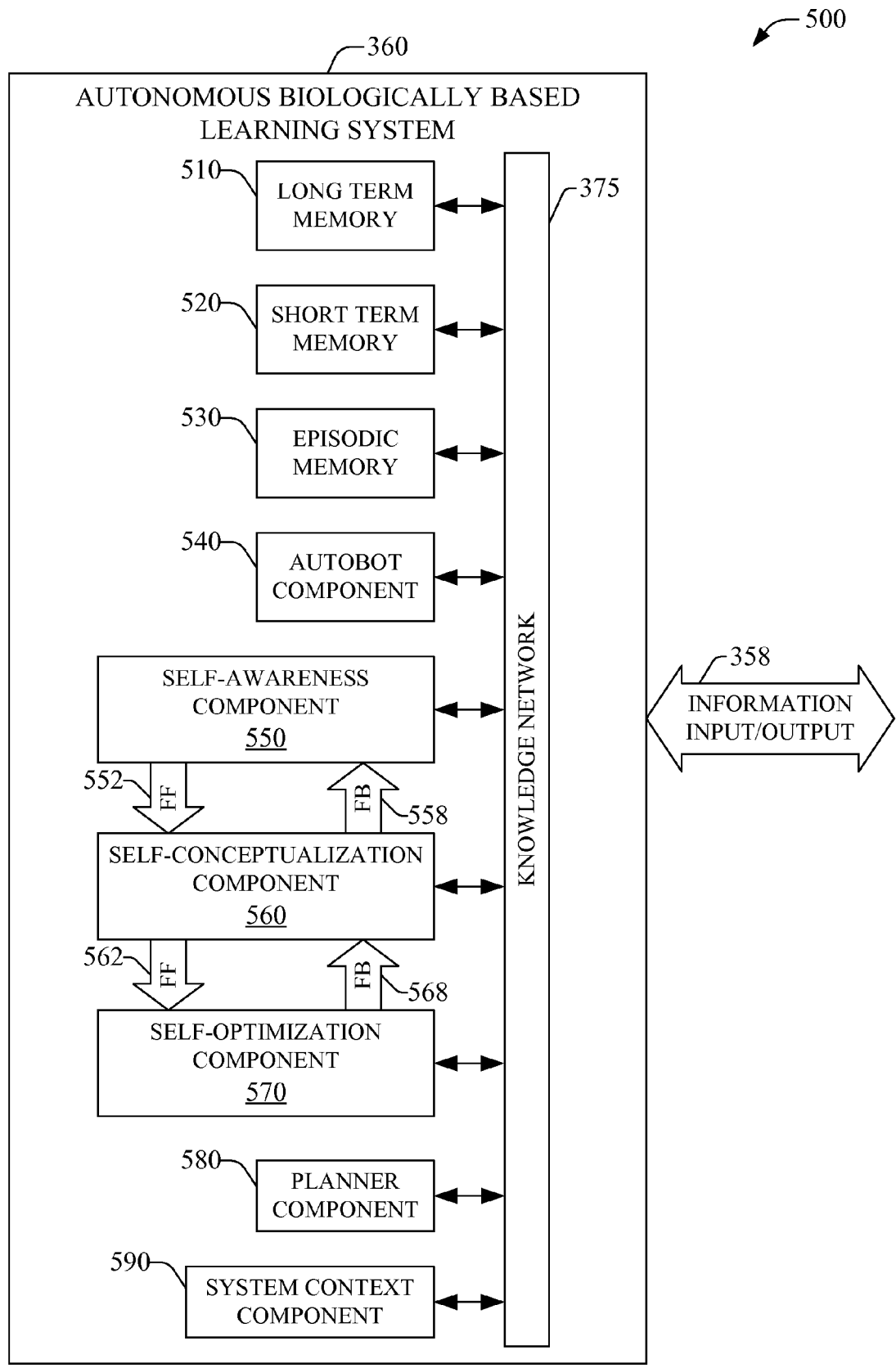
FIG. 5 illustrates a high level block diagram of example architecture of autonomous biologically based learning system.

FIG. 5 illustrates a high level block diagram of example architecture 500 of an autonomous biologically based learning system. In embodiment 500, autonomous learning system 360 comprises a hierarchy of functional memory components that include a long term memory (LTM) 510, a short term memory (STM) 520, and an episodic memory (EM) 530. Each of such functional memory components can communicate through knowledge network 375, which operates as described in discussed in connection with FIG. 3. In addition, autonomous learning system 360 can include an autobot component 540 that includes functional processing units identified as autobots, with substantially the same characteristics as those functional units described in connection with processing platform 385. It is to be noted that that autobot component 540 can be a part of processing platform 385.

Furthermore, autonomous learning system 360 can comprise one or more primary functional units which include a self-awareness component 550, a self-conceptualization component 560, and a self-optimizing component 570. A first feed forward (FF) loop 552 can act as a forward link and can communicate data among self-awareness component 550 and self-conceptualization 560. In addition, a first feed back (FB) loop 558 can act as a reverse link and can communicate data among self-conceptualization component 570 and self-awareness component 550. Similarly, forward link and reverse link data communication among self-conceptualization component 560 and self-optimization component 570 can be accomplished, respectively, through a second FF loop 562 and a second FB loop 568. It should be appreciated that in a FF link, data can be transformed prior to communication to the component that receives the data to further process it, whereas in a FB link a next data element can be transformed by the component that receives the data prior to process it. For example, data transferred through FF link 552 can be transformed by self awareness component 550 prior to communication of the data to self-conceptualizing component 560. It should further be appreciated that FF links 552 and 562 can facilitate indirect communication of data among components 550 and component 570, whereas FB links 568 and 558 can facilitate an indirect communication of data among components 570 and 550. Additionally, data can be conveyed directly among components 550, 360, and 370 through knowledge network 375.

Long term memory 510 can store knowledge supplied through interaction component 330 during initialization or configuration of a tool system (e.g., a priori knowledge) to train the autonomous learning tool system 300 after initialization/configuration. In addition, knowledge generated by autonomous learning system 360 can be stored in long term memory 510. It should be appreciated that LTM 510 can be a part of a memory platform 365 and thus can display substantially the same characteristics thereof. Long term memory 510 can generally comprise a knowledge base that contains information about tool system components (e.g., manufacturing components, probe components, and so on), relationships, and procedures. At least a portion of the knowledge base can be a semantic network that describes or classifies data types (for example as a sequence, an average, or a standard deviation), relationships among the data types, and procedures to transform a first set of data types into a second set of data types.

A knowledge base may contain knowledge elements, or concepts. In an aspect, each knowledge element can be associated with two numeric attributes: a suitability ($\xi$) and an inertia ($\iota$) of a knowledge element, or concept; collectively such attributes determine a priority of a concept. A well-defined function, e.g., a weighted sum, a geometric average, of these two numeric attributes can be a concept's situation score ($\sigma$). For example, $\sigma = \xi + \iota$. The suitability of a knowledge element can be defined as a relevance of the knowledge element (e.g., concept) to a tool system or a goal component situation at a specific time. In an aspect, a first element, or concept, with a higher suitability score than a second element can be more relevant to a current state of the autonomous learning system 360 and a current state of a tool system 310 than the second element with a lower suitability score. The inertia of a knowledge element, or concept, can be defined as the difficulty associated with utilization of the knowledge element. For example, a low first value of inertia can be conferred to a number element, a list of numbers can be attributed a second inertia value higher than the first value, a sequence of numbers can have a third value of inertia that is higher than the second value, and a matrix of numbers can have a fourth value of inertia which can be higher than the third value. It is noted that inertia can be applied to other knowledge or information structures like graphs, tables in a database, audio files, video frames, code snippets, code scripts, and so forth; the latter items can substantially all be a portion of input 130. The subject innovation provides for a well defined function of the suitability and the inertia that can influence the likelihood that a knowledge element is retrieved and applied. Concepts that have the highest situational score are the most likely concepts to be rendered to short term memory 520 for processing by processing units.

Short term memory 520 is a temporary storage that can be utilized as a working memory (e.g., a workspace or cache) or as a location where cooperating/competing operations, or autobots, associated with specific algorithms or procedures, can operate on data types. Data contained in STM 520 can possess one or more data structures. Such data structures in STM 520 can change as a result of data transformations effected by autobots and planner überbots (e.g., autobots dedicated to planning). The short term memory 305 can comprise data, learning instructions provided by the interaction manager 345, knowledge from the long term memory 310, data provided and/or generated by one or more autobots or überbots, and/or initialization/configuration commands provided by an actor 390. Short term memory 520 can track a state of one or more autobots and/or überbots used to transform data stored therein.

Episodic memory 530 stores episodes which can include an actor-identified set of parameters and concepts which can be associated with a process. In an aspect, an episode can comprise extrinsic data or input 130, and it can provide with a specific context to autonomous learning system 100. It is noted that an episode can generally be associated with a particular scenario identified or generated (e.g., by tool system 110, a goal component 120, or an autonomous learning system 160) while pursuing a goal. An actor that identifies an episode can be a human agent, like a process engineer, a tool engineer, a field support engineer, and so on, or it can be a machine. It should be appreciated that episodic memory 530 resembles a human episodic memory, wherein knowledge associated with particular scenario(s)—e.g., an episode—can be present and accessible without a recollection of the learning process that resulted in the episode. Introduction, or definition, of an episode typically is a part of a training cycle or substantially any extrinsic provision of input, and it can lead to an attempt by the autonomous biologically based learning system 360 to learn to characterize data patterns, or input patterns, that can be present in data associated with the episode. A characterized pattern of data associated with an episode can be stored in episodic memory 530 in conjunction with the episode and an episode's name. The addition of an episode to episodic memory 530 can result in a creation of an episode-specific autobot that can become active when a set of parameters in a process conducted by a tool system 310, or a generally a goal component 120, enter an operating range as defined in the episode; the episode-specific autobot receives sufficient activation energy when the first feature associated with a pursued goal or process is recognized. If the parameters meet the criteria established through a received episode, the episode-specific autobot compares the pattern of data in the episode with the current data available. If the current situation (as defined by the recognized pattern of data) of the tool system 310, or a goal component, matches the stored episode, an alarm is generated to ensure the tool maintenance engineers can become aware of the situation and can take preventive action(s) to mitigate additional damage to functional component 315 or sensor component 325 or material utilized in a tool process.

Autobot component 540 comprises a library of autobots that perform a specific operation on an input data type (e.g., a matrix, a vector, a sequence, and so on). In an aspect, autobots exist in an autobot semantic net, wherein each autobot can have an associated priority; a priority of an autobot is a function of its activation energy ($E_A$) and its inhibition energy ($E_I$). Autobot component 540 is an organized repository of autobots that can include autobots for the self-awareness component 550, self-conceptualization component 560, self-optimization component 570, and additional autobots that can participate in transforming and passing data among components and among the various memory units. Specific operations that can be performed by an autobot can include a sequence average; a sequence ordering; a scalar product among a first and a second vector; a multiplication of a first matrix and a second matrix; a time sequence derivative with respect to time; a sequence autocorrelation computation; a crosscorrelation operation between a first and a second sequence; a decomposition of a function in a complete set of basis functions; a wavelet decomposition of a time sequence numeric data stream, or a Fourier decomposition of a time sequence. It should be appreciated that additional operations can be performed depending on input data; namely, feature extraction in an image, sound record, or biometric indicator, video frame compression, digitization of environment sounds or voice commands, and so on. Each of the operations performed by an autobot can be a named function that transforms one or more input data types to produce one or more output data types. Each function for which there exists an autobot in autobot component 540 can possess an element in LTM, so that überbots can make autobot activation/inhibition energy decisions based on the total "attention span" and needs of the autonomous learning system 360. Analogously to the autonomous learning system 360, an autobot in autobot component 540 can improve its performance over time. Improvements in an autobot can include better quality of produced results (e.g., outputs), better execution performance (e.g., shorter runtime, capability to perform larger computations, and the like), or enhanced scope of input domain for a particular autobot (e.g., inclusion of additional data types that the autobot can operate on).

Knowledge—concepts and data—stored in LTM 510, STM 520 and EM 530 can be employed by primary functional units, which confer autonomous biologically based learning system 360 a portion of its functionality.

Self-awareness component 550 can determine a level of tool system degradation between a first acceptable operating state of the tool system 310 and a subsequent state, at a later time, in which tool system has degraded. In an aspect, autonomous learning system 360 can receive data that characterizes an acceptable operating state, and data associated with a product asset fabricated in such acceptable state; such data assets can be identified as canonical data. Autonomous biologically based learning system 360 can process the canonical data and the associated results (e.g., statistics about important parameters, observed drift in one or more parameters, predictive functions relating tool parameters, and so on) can be stored by self-awareness component 550 and employed for comparison to data supplied as information input 358; e.g., production process data or test run data. If a difference between generated, learnt results of the canonical data and the device process run-data is small, then the manufacturing system degradation can be considered to be low. Alternatively, if the difference between stored learnt results of the canonical data and the sample process data is large, then there can be a significant level of tool system (e.g., semiconductor manufacturing system) degradation. A significant level of degradation can lead to a process, or goal, contextual adjustment. Degradation as described herein can be computed from a degradation vector $(Q_1, Q_2, \ldots, Q_U)$ where each component $Q_\lambda$ ($\lambda=1, 2, \ldots, U$) of the degradation vector is a different perspective of an available data set—e.g., $Q_1$ may be a multivariate mean, $Q_2$ the associated multivariate deviation, $Q_3$ a set of wavelet coefficients for a particular variable in a process step, $Q_4$ may be the mean difference between a predicted pressure and measured pressure, etc. Normal training runs produce a specific set of values (e.g., a training data asset) for each component, which can be compared with component $Q_1$-$Q_U$ generated with run data (e.g., a run data asset) from each component. To assess degradation, a suitable distance metric can be to employed to compare the (e.g., Euclidean) distance of a run degradation vector from its "normal position" in $\{Q\}$ space; the large such Euclidean distance, the more a tool system is said to be degraded. In addition, a second metric can be to compute a cosine similarity metric among the two vectors.

Self-conceptualization component 560 can be configured to build an understanding of important tool system 310 relationships (e.g., one or more tool behavior functions) and descriptions (e.g., statistics regarding requested and measured parameters, influence of parameters on degradation, etc.). It is to be appreciated that relationships and descriptions are also data, or soft, assets. The understanding is established autonomously (e.g., by inference and contextual goal adaptation originated from input data; inference can be accomplished, for example, via multivariate regression or evolutionary programming, such as genetic algorithms) by autonomous learning system 360, or through an actor 390 (e.g., a human agent) supplied guidance. Self-conceptualization component 560 can construct a functional description of a behavior of a single parameter of a tool system 310, or generally a goal component like component 120, such as pressure in a deposition chamber in a semiconductor manufacturing system as a function of time during a specific deposition step. In addition, self-conceptualization component 560 can learn a behavior associated with a tool system, like a functional relationship of a dependent variable on a specific set of input information 358. In an aspect, self-conceptualization component 560 can learn the behavior of pressure in a deposition chamber of a given volume, in the presence of a specific gas flow, a temperature, exhaust valve angle, time, and the like. Moreover, self-conceptualization component 560 can generate system relationships and properties that may be used for prediction purposes. Among learnt behaviors, self-conceptualization component can learn relationships and descriptions that characterize a normal state. Such normal state typically is employed by autonomous learning system 360 as a reference state with respect to which variation in observer tool behavior is compared.

Self-optimization component 570 can analyze a current health or performance of an autonomous biologically based learning system 300 based on the level of a tool system 310 deviation between predicted values (e.g., predictions based on functional dependence or relationships learnt by self-conceptualization component 560 and measured values) in order to identify (a) a potential cause of failure of tool system 360, or (b) one or more sources of root cause of the tool system degradation based on information gathered by autonomous learning system 360. Self-optimizing component 570 can learn over time whether autonomous learning system 360 initially incorrectly identifies an erroneous root cause for a failure, the learning system 300 allows for input of maintenance logs or user guidance to correctly identify an actual root cause. In an aspect, the autonomous learning system 360 updates a basis for its diagnosis utilizing Bayesian inference with learning to improve future diagnosis accuracy. Alternatively, optimization plans can be adapted, and such adapted plans can be stored in an optimization case history for subsequent retrieval, adoption, and execution. Moreover, a set of adaptations to a process conducted by tool system 310, or generally a goal pursued by a goal component 120, can be attained through the optimization plans. Self-optimization component 570 can exploit data feedback (e.g., loop effected through links 565, 555, and 515) in order to develop an adaptation plan that can promote process or goal optimization.

In embodiment 500, autonomous biologically based learning system 360 can further comprise a planner component 580 and a system context component 590. The hierarchy of functional memory components 510, 520, and 530, and the primary functional units 550, 560, and 570 can communicate with planner component 580 and the system context component 590 through knowledge network 375.

Planner component 580 can exploit, and comprise, higher level autobots in autobot component 540. Such autobots can be identified as planner überbots, and can implement adjustments to various numeric attributes like a suitability, an importance, an activation/inhibition energy, and a communication priority. Planner component 580 can implement a rigid, direct global strategy; for instance, by creating a set of planner überbots that can force specific data types, or data structures, to be manipulated in short term memory 520 through specific knowledge available in short term memory 505 and specific autobots. In an aspect, autobots created by planner component 580 can be deposited in autobot component 540, and be utilized over the knowledge network 375. Alternatively, or in addition, planner component 580 can implement an indirect global strategy as a function of a current context of an autonomous learning system 360, a current condition of a tool system 310, a content of short term memory 520 (which can include associated autobots that can operate in the content), and a utilization cost/benefit analysis of various autobots. It should be appreciated that the subject autonomous biologically based learning tool 300 can afford dynamic extension of planner components.

Planner component 580 can act as a regulatory component that can ensure process, or goal, adaptation in an autonomous biologically based tool 300 does not result in degradation thereof. In an aspect, regulatory features can be implemented through a direct global strategy via creation of regulatory überbots that infer operational conditions based on planned process, or goal, adaptation. Such an inference can be effected through a semantic network of data types on which the regulatory überbots act, and the inference can be supported or complemented by cost/benefit analysis. It should be appreciated that planner component 580 can preserve goals drifting within a specific region of a space of goals that can mitigate specific damages to a goal component, e.g., a tool system 310.

System context component 590 can capture the current competency of an autonomous biologically based learning tool 300 that exploits autonomous learning system 360. System context component 590 can include a state identifier that comprises (i) a value associated with an internal degree of competency (e.g., a degree of effectiveness of a tool system 310 in conducting a process (or pursuing a goal), a set of resources employed while conducting the process, a quality assessment of a final product or service (or an outcome of a pursued goal), a time-to-delivery of devices, and so on), and (ii) a label, or identifier, to indicate the state of the autonomous learning tool 300. For instance, the label can indicate states such as "initial state," "training state," "monitoring state," "learning state," or "applying knowledge." The degree of competency can be characterized by a numerical value, or metric, in a determined range. Further, the system context component 590 can include a summary of learning performed by the autonomous learning system 360 over a specific time interval, as well as a summary of possible process or goal adaptations that can be implemented in view of the performed learning.

Figure 6A:
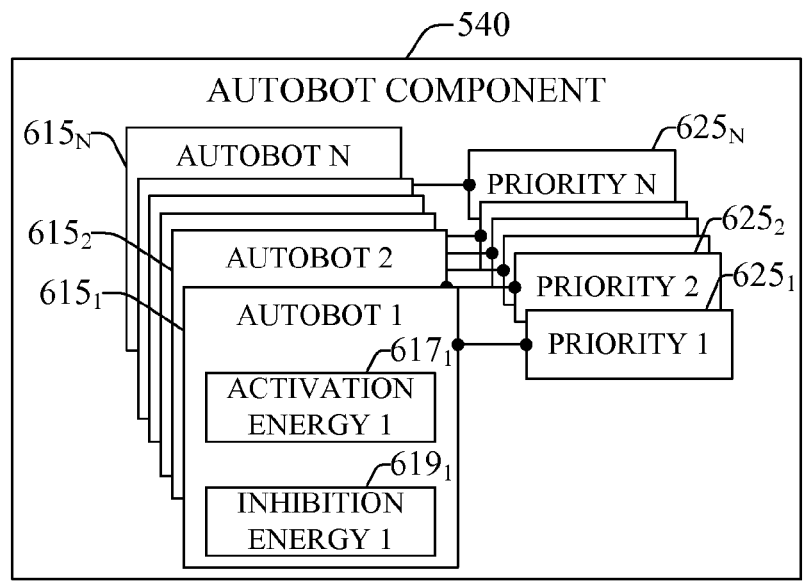
FIGS. 6A and 6B illustrate, respectively an example autobot component and an example autobot architecture.

FIG. 6A illustrates an example autobot component 540. Autobots $615_1$-$615_N$ represent a library of autobots and überbots, each with specific dynamics priority $625_1$-$625_N$. Autobots $615_1$-$615_N$ can communicate with a memory (e.g., a long term or short term memory, or an episodic memory). As indicated supra, an autobot's priority, is a determined by the autobot's activation energy and inhibition energy. An autobot (e.g., autobot $615_1$, or $615_N$) gains activation energy (through überbots) when data that can be processed by the autobot is in STM. A weighted sum of an autobot (e.g., autobot 6152) activation energy and inhibition energy, e.g., $\Sigma = w_A E_A + w_I E_I$, can determine when the autobot can activate itself to perform its functional task: The autobot self-activate when $\Sigma > \psi$, where $\psi$ is a predetermined, inbuilt threshold. It should be appreciated that the subject autonomous biologically based learning tool 300 can afford dynamic augmentation of autobots.

Figure 6B:
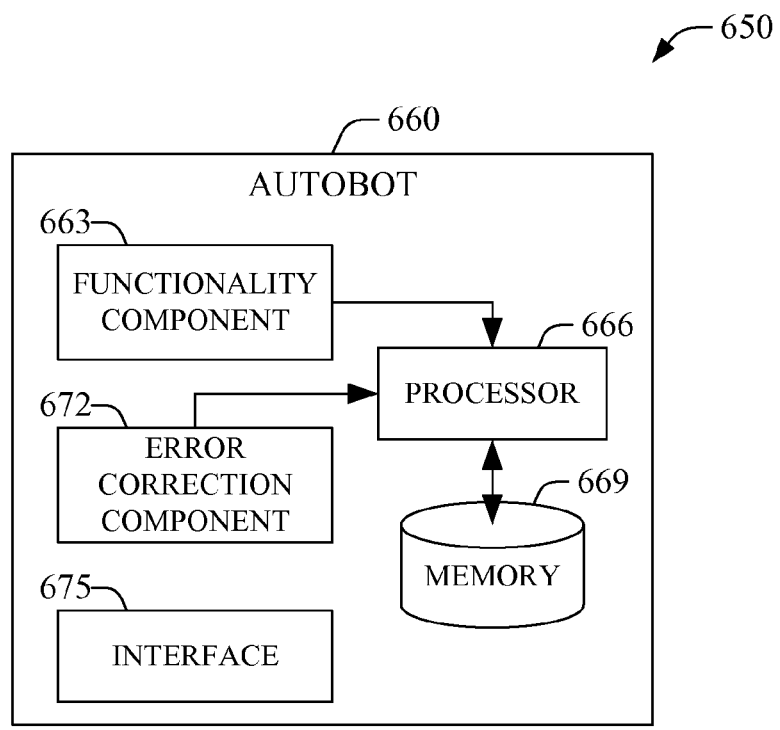

FIG. 6B illustrates an example architecture 650 of an autobot. The autobot 660 can be substantially any of the autobots included in an autobot component 340. A functionality component 663 determines and executes at least a portion of an operation that autobot 660 can perform on input data. Processor 666 can execute at least a portion of the operation performed by the autobot 660. In an aspect, processor 666 can operate as a co-processor of functionality component 663. Autobot 660 can also comprise an internal memory 669 in which a set of results of previously performed operations. In an aspect, internal memory operates as a cache memory that stores input data associated with an operation, current and former values of $E_A$ and $E_P$, a log of the history of operation of the autobot, and so on. Internal memory 669 can also facilitate autobot 660 to learn how to improve quality of forthcoming results when a specific type and quantity of error is fed back or back propagated to the autobot 660. Therefore, autobot 660 can be trained through a set of training cycles to manipulate specific input data in a specific manner.

An autobot (e.g., autobot 660) can also be self-describing in that the autobot can specify (a) one or more types of input data the autobot can manipulate or require, (b) a type of data the autobot can generate, and (c) one or more constraints on input and output information. In an aspect, interface 672 can facilitate autobot 660 to self-describe and thus express the autobot's availability and capability to überbots, in order for the überbots to supply activation/inhibition energy to the autobots according to a specific tool scenario.

Figure 7:
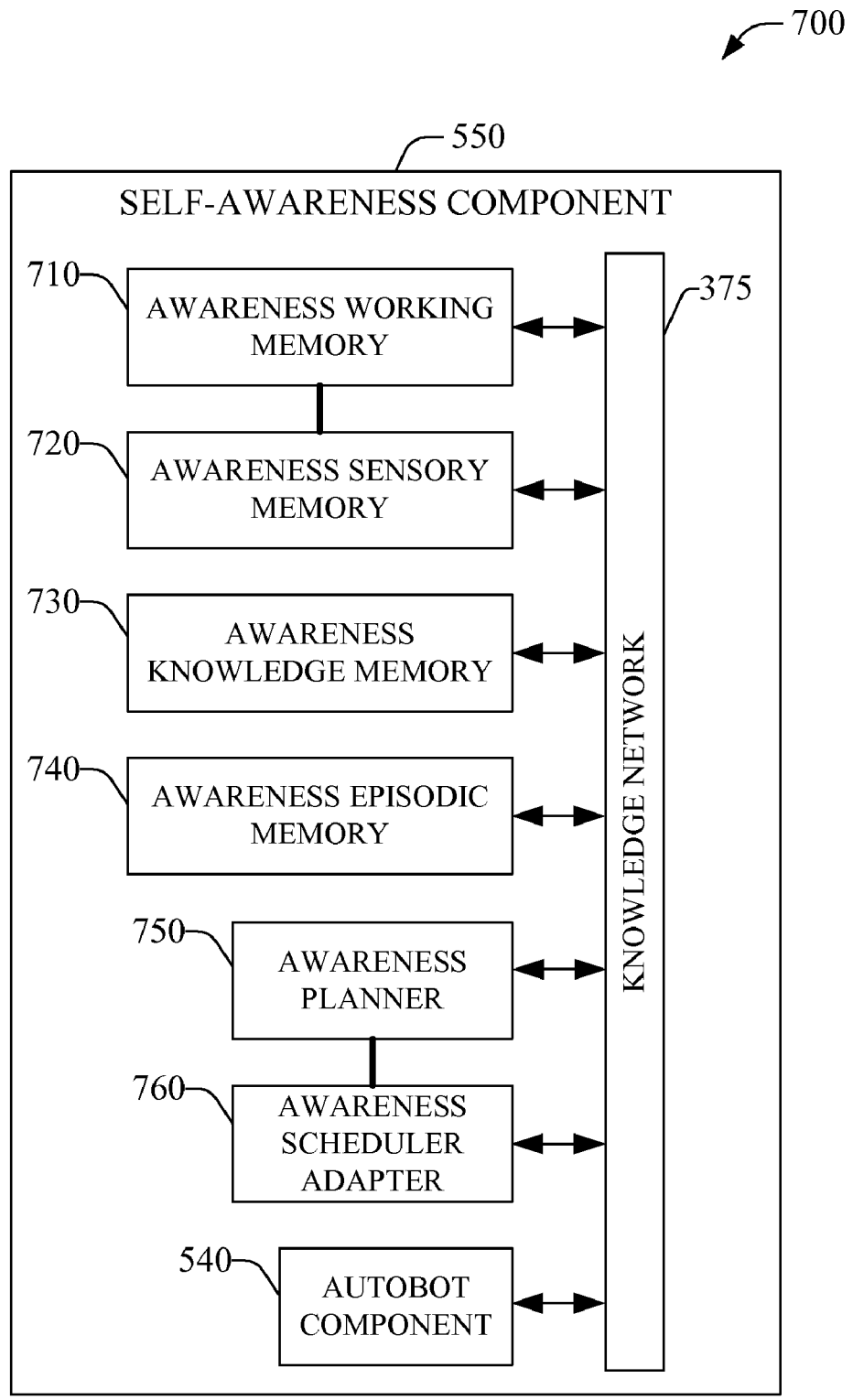
FIG. 7 illustrates an example architecture of a self-awareness component of an autonomous biologically based learning system.

FIG. 7 illustrates example architecture 700 of a self-awareness component in an autonomous biologically based learning system. Self-awareness component 350 can determine a current level of degradation with respect to a learned normal state in a tool system (e.g., tool system 310). Degradation can arise from multiple sources such as wear-and-tear or mechanical parts in the tool system; improper operation or developmental operation to develop recipes (e.g., a data asset) or processes that can force tool system to operate outside one or more optimal ranges; improper customization of tool system; or inadequate adherence to maintenance schedules. Self-awareness component 550 can be recursively assembled, or defined, through (i) a hierarchy of memories, e.g., awareness memories which can be part of memory platform 365, (ii) functional operational units such as awareness autobots that can reside in an autobot component 540 and be a part of processing platform 385, and (iii) a set of awareness planners. Based on the level of degradation, autonomous learning system 360 can analyze available data assets 328 as well as information 358 to rank the possible faults. In an aspect, in response to an excessive level of degradation, e.g. a tool system fault, an actor (e.g., a field engineer) can perform one or more maintenance activities like cleaning a chamber, replacing a focus ring, etc. In case of a successful repair of tool system, as confirmed, for example, by recovering degradation levels consistent with degradation prior to the system fault, and associated symptoms (e.g., data assets and patterns, relationships, and substantially any other type of understanding extracted from such combination) that preceded the maintenance activities can be retained by autonomous learning system 360. Thus, in forthcoming instances in which learned symptoms are identified through new understanding autonomously gleaned from data assets, and degradation analysis, a stored repair plan can be replayed reduce costs and improve mean time to repair (MTTR).

Awareness working memory (AWM) 710 is a S™ that can include a special region of memory identified as awareness sensory memory (ASM) 720 that can be utilized to store data, e.g., information input 358, that can originate in a sensor in sensor component 325 or in actor 390, can be packaged by one or more adaptors in adaptor component 335, and can be received by knowledge network 375. Self-awareness component 550 can also comprise multiple special functionality autobots, which can reside in autobot component 540 and include awareness planner überbots (APs).

In addition, self-awareness component 550 can comprise an awareness knowledge memory (AKM) 730 which is a part of a L™ and can include multiple concepts—e.g., an attribute; an entity such as a class or a causal graph; a relationship, or a procedure—relevant to the operation of self-awareness component 550. In an aspect, a self-awareness component 550 for a semiconductor manufacturing tool can include domain specific concepts like a step, a run, a batch, a maintenance-interval, a wet-clean-cycle, etc., as well as general purpose concepts like a number, a list, a sequence, a set, a matrix, a link, and so on. Such concepts can enter a higher level of abstraction; for instance, a wafer run can defined as an ordered sequence of steps where a step has both recipe parameter settings (e.g., desired values), and one or more step measurements. Furthermore, AKM 730 can include functional relationships that can link two or more concepts like an average, a standard deviation, a range, a correlation, a principal component analysis (PCA), a multi-scale principal component analysis (MSPCA), a wavelet or substantially any basis function, etc. It should be noted that multiple functional relationships can be applicable, and hence related, to a same concept; for example, a list of numbers is mapped to a real number instance by the average, which is a (functional) relation and a standard-deviation relation, as well as a maximum relation, and so forth). When a relationship from one or more entities to another entity is a function or a functional (e.g., a function of a function), there can be an associated procedure that can executed by an überbot in order to effect the function. A precise definition of a concept can be expressed in a suitable data schema definition language, such as UML, OMGL, etc. It should be further noticed that a content of AKM 730 can be augmented dynamically at (tool system) runtime without shutting the system down.

Each concept in AKM 730, as any concept in a knowledge base as described herein, can be associated with a suitability attribute and an inertia attribute, leading to the concept's specific situation score. Initially, before the autonomous system is provided with data, the suitability value for all elements in AKM 730 is zero, but the inertia for all concepts can be tool dependent and can be assigned by an actor, or based on historical data (e.g., data in database(s) 355). In an aspect, inertia of a procedure that produces an average from a set of numbers can be substantially low (e.g., $\iota=1$) because computation of an average can be regarded as a significantly simple operation that can be applicable to substantially all situations involved collected data sets, or results from computer simulations. Similarly, maximize and minimize procedures, which transform a set of numbers, can be conferred a substantially low inertia value. Alternatively, compute a range and compute a standard deviation can be afforded higher inertia values (e.g., $\iota=2$) because such knowledge elements are more difficult to apply, whereas calculate a PCA can display a higher level of inertia and calculate a MSPCA can have a yet higher value of inertia.

A situation score can be employed to determine which concept(s) to communicate among from AKM 730 and AWM 710 (see below). Knowledge elements, or concepts, that exceed a situation score threshold are eligible to be conveyed to AWM 710. Such concepts can be conveyed when there is sufficient available storage in AWM 710 to retain the concept and there are no disparate concepts with a higher situation score that have not been conveyed to AWM 710. A concept's suitability, and thus a concept's situation score, in AWM 710 can decay as time progresses, which can allow new concepts with a higher suitability to enter awareness working memory 710 when one or more concepts already in memory are no longer needed or are no longer applicable. It is noted that the larger the concept's inertia the longer it takes the concept to both be conveyed to and be removed from AWM 710.

When a tool system state changes, e.g., a sputter target is replaced, an electron beam gun is added, a deposition process is finished, an in situ probe is initiated, an annealing stage is completed, and so on, awareness planner 550 überbots can document which concepts (e.g., knowledge elements) can be applied in the new state, and can increase a suitability value, and thus a situation score, of each such a concept in AKM 730. Similarly, the activation energy of autobots $615_1$-$615_N$ can be adjusted by überbots in order to reduce the activation energy of specific autobots, and to increase $E_A$ for autobots that are appropriate to a new situation. The increment in suitability (and situation score) can be spread by planner überbots to those concepts' first neighbors and then to second neighbors, and so forth. It should be appreciated that a neighbor of a first concept in AKM 730 can be a second concept that resides, in a topological sense, within a specific distance from the first concept according to a selected measure, e.g. number of hops, Euclidean distance, etc.) It is noted that the more distant a second concept is from a first concept that received an original increment in suitability, the smaller the second concept's increment in suitability. Thus, suitability (and situation score) increments present a dampened spread as a function of "conceptual distance."

In architecture 500, self-awareness component 550 comprises an awareness schedule adapter (ASA) 760 which can be an extension of awareness planner component 750 and can request and effect changes in collection extrinsic data or intrinsic data (e.g., via sensor component 325 through interaction component 330, via input 130, or via (feedback) link 155). In an aspect, awareness schedule adapter 760 can introduce data sampling frequency adjustments—e.g., it can regulate a rate at which different adaptors in adaptor component 335 can convey data to knowledge network 375 (e.g., information input 358) intended for ASM 720. Moreover, awareness schedule adapter 760 can sample at low frequency, or substantially eliminate, collection of data associated with process variables that are not involved in the description of normal patterns of data, or variables that fail to advance the accomplishment of a goal as inferred from data received in an adaptive inference engine. Conversely, ASA 760 can sample at higher frequency a set of variables extensively used in a normal pattern of data, or that can actively advance a goal. Furthermore, when the autonomous learning system 360 acknowledges a change of state tool system 310 (or a change in a situation associated with a specific goal) wherein data indicate that product quality or process reliability are gradually deviating from normal data patterns (or a goal drift is resulting in significant departure from an initial goal in the space of goals), the autonomous learning system can request, via ASA 760, a more rapid sampling of data to collect a larger volume of actionable information (e.g., input 130) that can effectively validate the degradation and trigger an appropriate alarm accordingly. In an aspect, a goal component can display a goal drift summary to an actor that entered an initial goal; e.g., a customer in an electronics store that has substantially departed from an initial expenditure goal when procuring a home entertainment system can be displayed a log with changes in a projected expense after budget adaptation; or a database architect can be shown costs associated with memory space and associated infrastructure upon adaptation of a goal to optimize a data warehouse.

An actor 390 (e.g., a human agent) can train self-awareness component 550 in multiple manners, which can include a definition of one or more episodes (including, for instance, illustrations of successfully adapted goals). A training of the autonomous learning system 360, through self-awareness component 550, for an episode can occur as follows. The actor 390 creates an episode and provides the episode with a unique name. Data for the newly created episode can then be given to autonomous learning system 360. The data can be data for a specific sensor during a single specific operation step of a tool system, a set of parameters during a single specific step, a single parameter average for a run, etc.

Alternatively, or additionally, more elementary guidance can be provided by actor 390. For example, a field support engineer can perform preventive tool maintenance ($P_M$) on tool system 310. $P_M$ can be planned and take place periodically, or it can be unplanned, or asynchronous. It should be appreciated that preventive tool maintenance can be performed on the manufacturing system in response to a request by the autonomous learning system 360, in response to routine preventive maintenance, or in response to unscheduled maintenance. A time interval elapses between consecutive PMs, during such a time interval one or more processes (e.g., wafers/lots manufacturing) can take place in the tool system. Through data and product assets and associated information, such as effected planner and unplanned maintenance, autonomous learning system can infer a "failure cycle." Thus, the autonomous learning system can exploit asset(s) 328 to infer a mean time between failures (MTBF). Such inference is supported through a model of time-to-failure as a function of critical data and product assets. Furthermore, autonomous learning system 360 can develop models, through relationships among disparate assets received as information I/O 358 or through historic data resulting from supervised training sessions delivered by an expert actor. It should be appreciate that an expert actor can be a disparate actor that interacts with a trained disparate autonomous learning system.

Actor 390 can guide the autonomous system by informing the system that it can average wafer level run data and assess a drift in critical parameters across $P_M$ intervals. A more challenging exercise can also be performed by the autonomous system, wherein the actor 390 indicates through a learning instruction to autonomous learning system 360 to learn to characterize a pattern of data at the wafer average level before each unplanned $P_M$. Such an instruction can promote the autonomous learning system 360 to learn a pattern of data prior to an unplanned $P_M$, and if a pattern of data can be identified by an awareness autobot, the self-awareness component 550 can learn such a pattern as time evolves. During learning a pattern, awareness component 550 can request assistance (or services) from self-conceptualization component 560 or awareness autobots that reside in autobot component 540. When a pattern for the tool system is learned with a high degree of confidence (e.g. measured by a degree of reproducibility of the pattern as reflected in coefficients of a PCA decomposition, a size of a dominant cluster in a K-cluster algorithm, or a prediction of the magnitude of a first parameter as a function of a set of disparate parameters and time, and so forth), autonomous biologically based learning system 360 can create a reference episode associated with the malfunction that can lead to the need of tool maintenance so that an alarm can be triggered prior to occurrence of the reference episode. It is noted that awareness autobots, which can reside in autobot component 540, can fail to characterize completely a data pattern for the malfunction reference episode, or substantially any specific situation that can require unplanned maintenance, before it is necessary. It should be appreciated nonetheless that such a preventive health management of a tool system 310, which can include a deep behavioral and predictive functional analysis, can be performed by autobots in self-conceptualization component 560.

Figure 8:
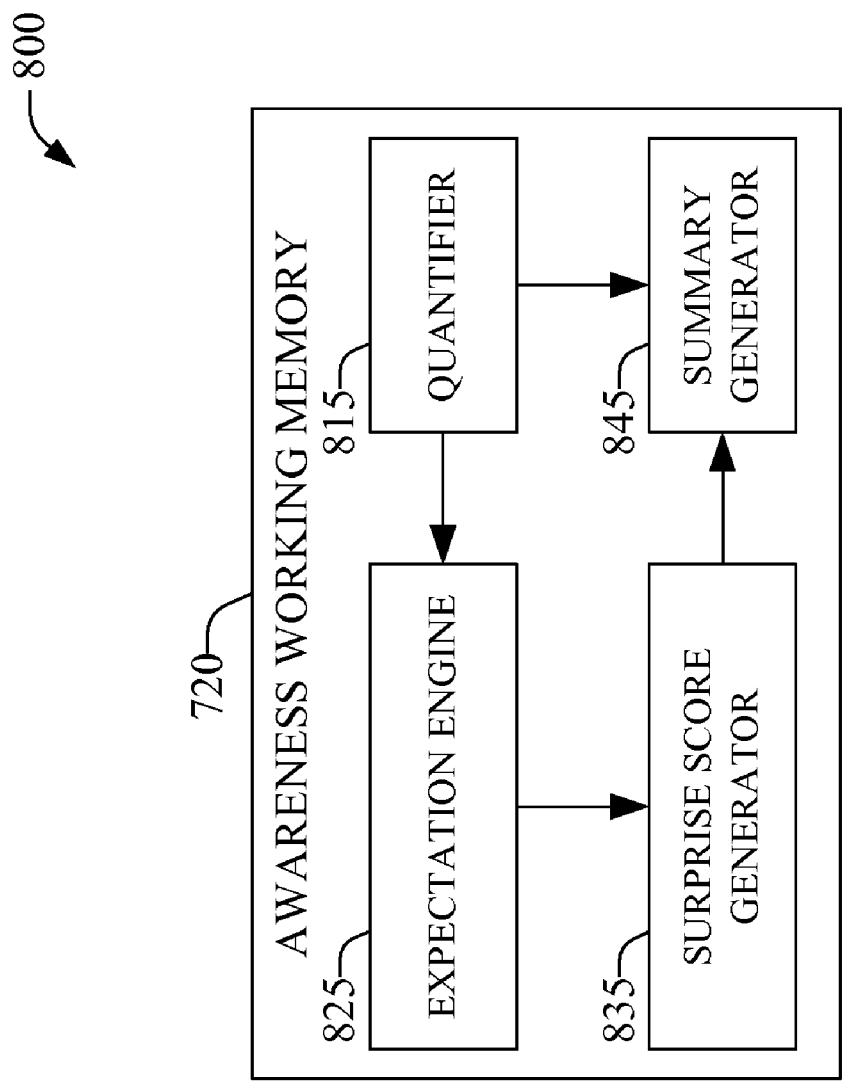
FIG. 8 is a diagram of example autobots that operate in an awareness working memory according to aspects described herein.

FIG. 8 is a diagram 800 of autobots that can operate in an awareness working memory 520. Illustrated autobots—quantifier 815, expectation engine 825, surprise score generator 835, and summary generator 845—can compose an awareness engine; a virtual emergent component, whose emergent nature arises from the concerted operation of elementary constituents, e.g., autobots 815, 825, 835, and 845. It should be appreciated that the awareness engine is an example of how one or more planning überbots can use a collection of coordinated autobots to perform a sophisticated activity. The planning überbots employ the various autobots (e.g., average, standard deviation, PCA, wavelet, derivative, etc.) or the services of self-conceptualization component 560 to characterize a pattern of the data received in an autonomous biologically based learning system. Data for each step, run, lot, etc. run can be labeled by an external entity as being normal or abnormal during training. Quantifier 815 can be employed by planning überbots to exploit normal data to learn a pattern of data for a prototypical, normal process. In addition, quantifier 815 can assess an unlabeled data set (e.g., information input 358) that is deposited into ASM 720 and compare the normal data pattern with a data pattern of unlabeled data. Expected patterns for normal data or equations to predict parameters with normal data can be stored and manipulated through expectation engine 825. It should be noted that the pattern of unlabeled data can differ from the normal data pattern in various ways, according to multiple metrics; for instance, a threshold for a Hotelling T2 statistic (as applied to PCA and MS-PCA and derived from training runs) can be exceeded; an average of a data subset of the unlabeled data set can differ by more than $3\sigma$ (or other predetermined deviation interval) from the average computed with normal, training run data; a drift of measured parameters can be substantially different from that observed in the data associated with a normal run; and so forth. Summary generator 845 thus generates a vector of components for normal data, whereas surprise score generator 835 can incorporate, and rank or weight substantially all such differences in components of the vector and compute a net degradation surprise score for the tool system that reflect a health condition of the tool system and reflect how far "away from normal" the tool system is. It should be appreciated that discrepancies among a normal and unlabeled metric can vary as a function of time. Thus, through collection of an increasing amount of normal data, the autonomous learning system 360 can learn various operational limits with greater level of statistical confidence as time evolves and can adjust manufacturing process recipes (e.g., a goal) accordingly Degradation condition, as measured through a surprise score, for example, can be reported to an actor via summary generator 845.

Figure 9:
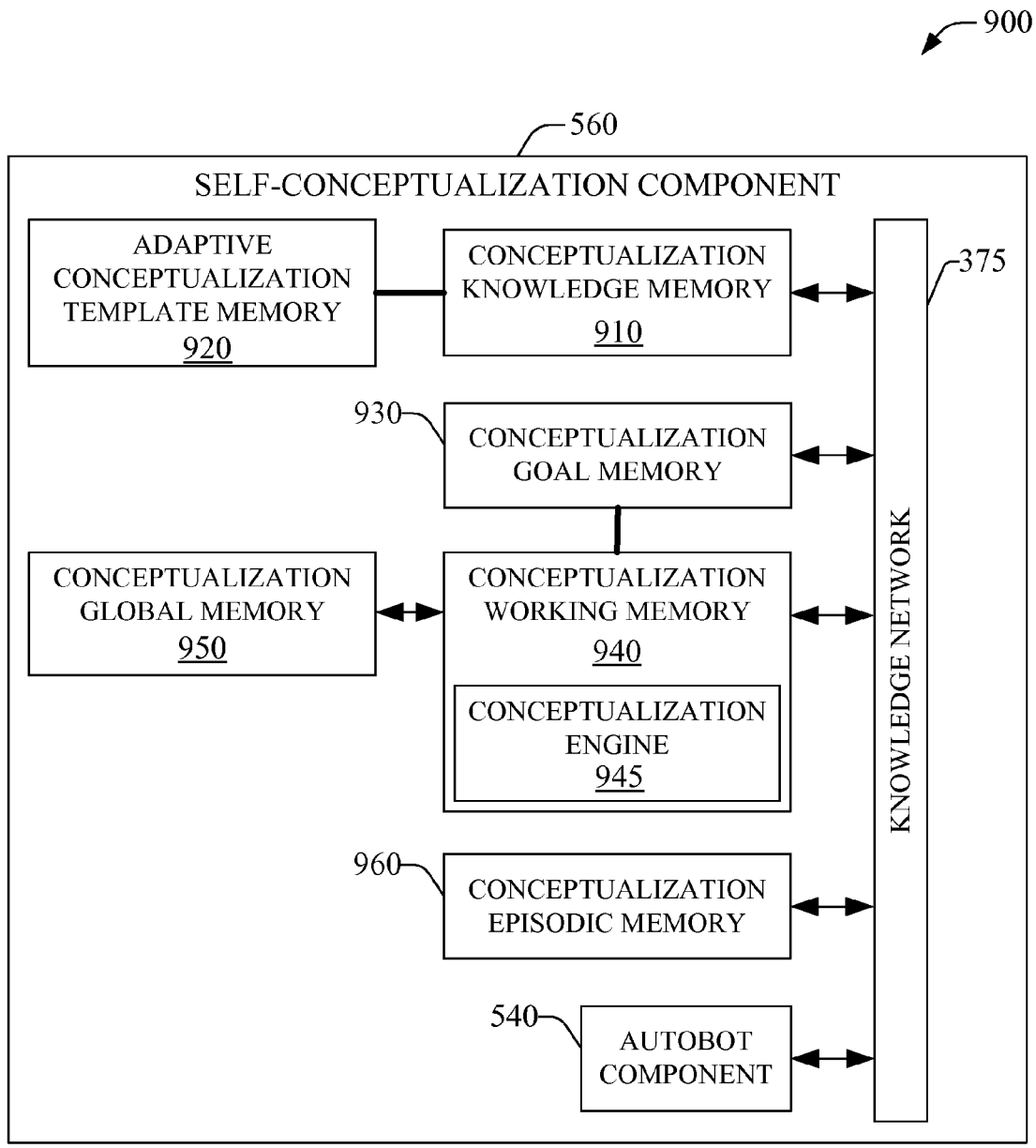
FIG. 9 illustrates an example embodiment of a self-conceptualization component of an autonomous biologically based learning system.

FIG. 9 illustrates and example embodiment 900 of a self-conceptualization component of an autonomous biologically based learning system. A functionality of self-conceptualization component is to build an understanding of important semiconductor manufacturing tool relationships and descriptions. Such an understanding can be employed to adjust a manufacturing process (e.g., a goal). This acquired understanding is built autonomously or in conjunction with end-user (e.g., actor 390) supplied guidance. Similarly to the other primary functional components 550 and 560, self-conceptualization component 570 is assembled or defined recursively in terms of a hierarchy of memories, operational units, or autobots, and planners; such components can communicate a priority-enabled knowledge network.

Embodiment 900 illustrates a conceptualization knowledge memory (CKM) 910 that includes concepts (e.g., attributes, entities, relationships, and procedures) necessary for operation of self-conceptualization component 570. Concepts in CKM 910 include (i) domain specific concepts such as a step, a run, a lot, a maintenance-interval, a wet-clean-cycle, a step-measurements, a wafer-measurements, a lot-measurements, a location-on-wafer, a wafer-region, a wafer-center, a wafer-edge, a first-wafer, a last-wafer, etc.; and (ii) general purpose, domain independent concepts like a number, a constant (e.g., e, Z), a variable, a sequence, a time-sequence, a matrix, a time-matrix, a fine-grained-behavior, a coarse-grained-behavior, etc. Self-conceptualization component also includes a vast array of general purpose functional relations such as add, subtract, multiply, divide, square, cube, power, exponential, log, sine, cosine, tangent, erf and so forth, as well as other domain specific functional relations that can present various levels of detail and reside in adaptive conceptualization template memory (ACTM) 920.

ACTM 920 is an extension of CKM 910 that can hold functional relationships that are either completely or partially known to an actor (e.g., an end user) that interacts with a tool system 310 (e.g., a semiconductor manufacturing tool). It should be noted that while ACTM is a logical extension of CKM, autobots, planners, and other functional components are not affected by such separation, as the actual memory storage can appear a single storage unit within self-conceptualization component 560. Self-conceptualization component 560 can also include a conceptualization goal memory (CGM) 930 which is an extension of a conceptualization working memory (CWM) 940. CGM 930 can facilitate autobots of a current goal, e.g., to learn f pressure, time, step); for a particular process step, learn a function f of pressure wherein the function depends on time. It should be noted that learning function f represents a sub-goal that can facilitate accomplishing the goal of manufacturing a semiconductor device utilizing tool system 310.

Concepts in ACTM 920 also have a suitability numeric attribute and an inertia numeric attribute, which can lead to a situation score. A value of inertia can indicate a likelihood of a concept to be learnt. For example, a higher inertia value for a matrix concept and a lower inertia for a time-sequence concept can lead to a situation where self-conceptualization component 560 can learn a functional behavior of time-sequences rather than a functional behavior of data in a matrix. Similarly to self-awareness component 550, concepts with lower inertia are more likely to be conveyed from CKM 910 to CWM 940.

Conceptual planners (CPs) provide activation energy to the various autobots and provide situation energy to various concepts in CKM 910 and ACTM 920, as a function of a current context, a current state of tool system 310 (or generally a goal component 120), a content of CWM 940, or current autobot(s) active in CWM 940. It should be appreciated that activation energy and situation energy alterations can lead to goal adaptation based on the knowledge generated (e.g., based on learning) as a result of the altered semantic network for concepts in CWM 940 or CKM 910—as inference by an adaptive inference engine can be based on propagation aspects of concepts.

Contents of CTM 920 are concepts which can describe the knowledge discussed above, and thus those concepts can have suitability and inertia numeric attributes. The contents of CTM 920 can be used by autobots to learn the functional behavior of the tool system 310 (subject to the constraint that concepts with lower inertia are more likely to be activated over concepts with higher inertia.). It is not necessary for all guidance to have the same inertia; for instance, a first complete function can be provided a lower inertia than a second complete function even though both concepts represent complete functions.

When partial knowledge like a partially-defined equation is uploaded in CWM 940, it can be completed, e.g., with existing knowledge—CPs coordinate autobots to employ available data to first identify values for unknown coefficients. A set of ad hoc coefficients can thus complete the partially-defined equation concept into a complete function concept. The complete equation concept can then be utilized in a pre-built functional-relation concept such as add, multiply, etc. Basic knowledge with output (e.g., relationship(output($\kappa_E$), T)) can facilitate autobots in CWM 940 to construct and evaluate various functional descriptions that involve data for $\kappa_E$ and T in order to identify the best function that can describe a relationship among $\kappa_E$ and T. Alternatively, basic knowledge without output can facilitate autobots, with assistance of CPs, to specify a variable as an output, or independent, variable and attempt to express it as a function of the remaining variables. When a good functional description is not found, an alternative variable can be specified as an independent variable the process is iterated until it converges to an adequate functional relationship or autonomous learning system 360 indicates, for example to actor 390, that an adequate functional relationship is not found. An identified good functional relationship can be submitted to CKM 910 to be utilized by autobots in autonomous learning system 360 with a level of inertia that is assigned by the CPs. For instance, the assigned inertia can be a function of the mathematical complexity of the identified relationship—a linear relationship among two variables can be assigned an inertia value that is lower than the assigned inertia to a non-linear relationship that involve multiple variables, parameters, and operators (e.g., a gradient, a Laplacian, a partial derivative, and so on).

Conceptualization engine 945 can be a "virtual component" that can present coordinated activities of awareness autobots and conceptualization autobots. In an aspect, self-awareness component 550 can feed forward (through FF loop 552) a group of variables (e.g., variables in the group can be those that display good pairwise correlation properties) to self-conceptualization component 560. Forwarded information can facilitate self-conceptualization component 560 to check CKM 910 and ACTM 920 for function relation templates. The availability of a template can allow an autobot of a conceptualization learner (CL), which can reside in the conceptualization engine 945, to more quickly learn a functional behavior among variables in a forwarded group. It should be appreciated that learning such a functional behavior can be a sub-goal of a primary goal. A CL autobot with the assistance of a CP autobot can also use autobots of a conceptualization validator (CV). CV autobots can evaluate a quality of proposed functional relationships (e.g., average error between a predicted value and a measurement is within instrument resolution). A CL autobot can independently learn a functional relationship either autonomously or through actor-supplied guidance; such actor supplied guidance can be regarded as extrinsic data. Functions learned by a CL can be fed back (e.g., via FB link 558) to self-awareness component 550 as a group of variables of interest. For example, after learning the function $\kappa_E = \kappa_0 \exp(-U/T)$, wherein $\kappa_0$ (e.g., an asymptotic etch rate) and U (e.g., an activation barrier) possess specific values known to the CL, self-conceptualization component 560 can feed back the guidance group (output($\kappa_E$, T) to self-awareness component 550. Such feed back communication can afford self-awareness component 550 to learn patterns about such group of variables so that degradation with respect to the group of variables can be quickly recognized and, if necessary, an alarm generated (e.g., an alarm summary, an alarm recipient list verified) and triggered. Memory 960 is a conceptualization episodic memory.

The following two aspects related to CL and CV should be noted. First, CL can include autobots that can simplify equations (e.g., through symbolic manipulation), which can facilitate to store a functional relationships as a succinct mathematical expression. As an example, the relationship $P=((2+3)\Phi)((1+0)\div\theta)$ is simplified to $P=3\Phi\div\theta$, where P, $\Phi$ and $\theta$ indicate, respectively, a pressure, a flow and an exhaust valve angle. Second, CV can factor in the complexity of the structure of an equation when it determines a quality of the functional relationship—e.g., for parameters with substantially the same characteristics, like average error of predicted values versus measurements, a simpler equation can be preferred instead of a more complicated equation (e.g., simpler equation can have lower concept inertia).

Additionally, important FF 552 communication of information from self-awareness component 550 to self-conceptualization component 560, and FB 558 communication from self-conceptualization component 560 to self-awareness component 550, can involve cooperation of awareness autobots and conceptualization autobots to characterize a pattern of data for an episode. As discussed above in connection with FIG. 5, when self-awareness component 550 fails to learn an episode, self-conceptualization component 560 can assist self-awareness component 550 through provision of a set of relevant functional relationships. For example, characterization of an episode can require a fine-grained description of time dependence of a pressure in a stabilization step in a process run in a tool system 310. Self-conceptualization component 560 can construct such a detailed (e.g., second by second) time dependence of the pressure in the stabilization step. Thus, through FB loop 558, self-awareness component 550 can learn to characterize the pattern of pressure during the stabilization step in a normal tool situation and to compare the learnt pressure time dependence with a pattern of pressure in a specific episode data. As an illustration, presence of a spike in a measured pressure prior to a stabilization step for data in an episode, and the absence of the spike in pressure data during normal tool operation can be detected as a data pattern that identifies the occurrence of the episode in an autonomous biologically based learning tool 300.

Similarly, a prediction of an unscheduled $P_M$ can rely on knowledge of temporal fluctuations of critical measurements of tool system data and the availability of a set of predictive functions conveyed by self-conceptualization component 570. The predictive functions can assist a self-awareness component (e.g., component 550) to predict an emerging situation of an unplanned $P_M$ in cases where the prediction depends on projected values of a set of variables as a function of time.

Figure 10:
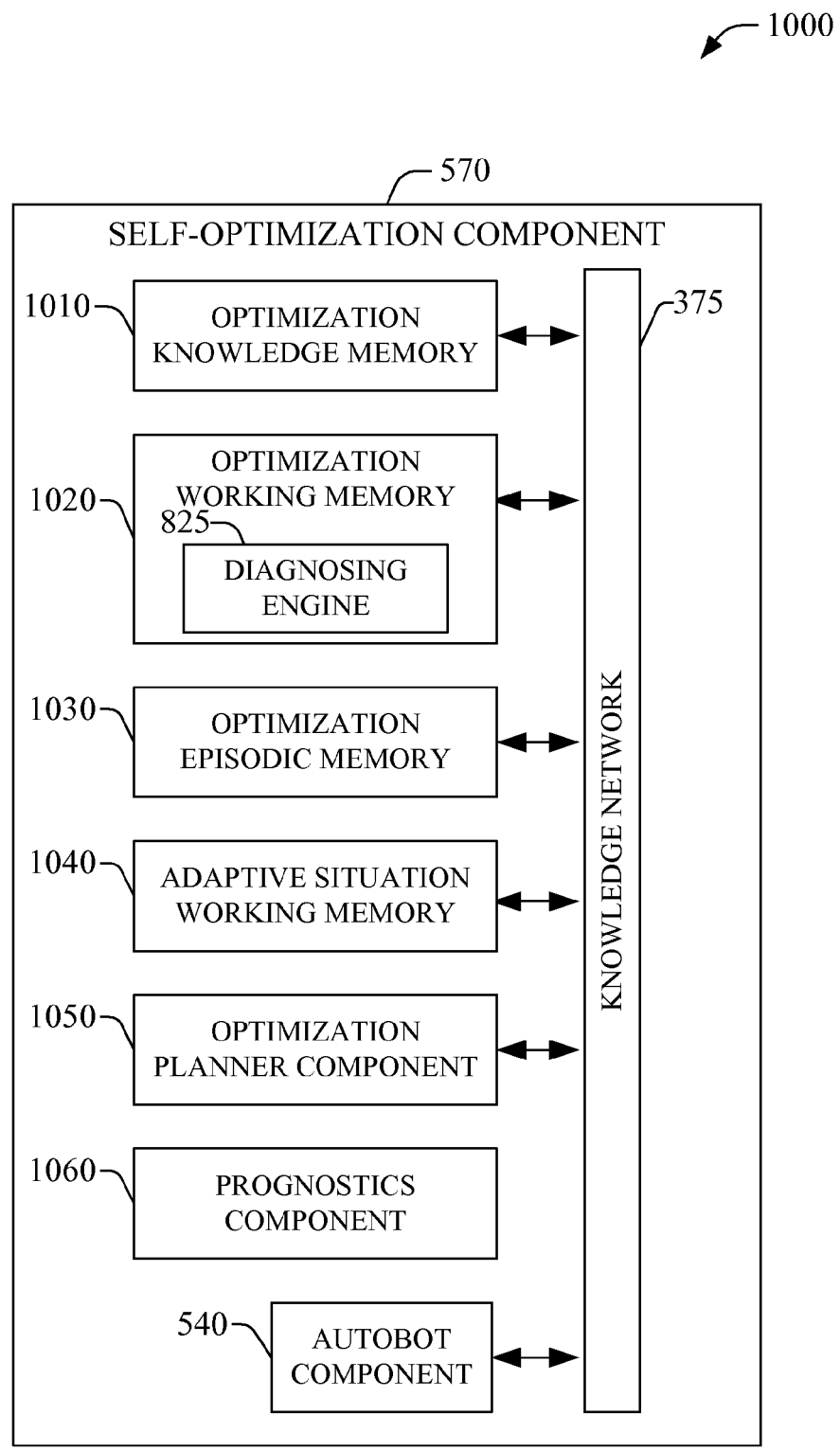
FIG. 10 illustrates and example embodiment of a self-optimization component in an autonomous biologically based learning system.

FIG. 10 illustrates and example embodiment 1000 of a self-optimization component in an autonomous biologically based learning system. As indicated above, self-optimization component functionality is to analyze the current health (e.g., performance) of a tool system 310 and, based on the results of the current health analysis, diagnose or rank substantially all potential causes for health deterioration of the tool system 310, and identify a root cause based on learning acquired by autonomous learning system 360. Analogously to the other primary functional components 550 and 560, self-optimization component 570 is built recursively from a hierarchy of memories that can belong to a memory platform 365, and autobots and planners which can be a part of a processing platform 385.

Optimization knowledge memory (OKM) 1010 contains concepts (e.g., knowledge) related to diagnosis and optimization of the behavior of tool system 310. It should be appreciated that a behavior can include a goal or a sub-goal. Accordingly, OKM 1010 contains domain, or goal, specific concepts such as step, step-data, run, run-data, lot, lot-data, $P_M$-time-interval, wet-clean-cycle, process-recipe, sensor, controller, etc. The latter concepts are associated with a tool system 310 that manufactures semiconductor devices. In addition, OKM 1010 comprises domain independent concepts, which can include a reading (e.g., readings from a pressure sensor in sensor component 325), a sequence, a comparator, a case, a case-index, a case-parameter, a cause, an influence, a causal-dependency, an evidence, a causal-graph, etc. Furthermore, OKM 1010 can comprise a set of functional relations like compare, propagate, rank, solve, etc. Such functional relations can be exploited by autobots, which can reside in autobot component 540 and can confer OKM 1010 at least a portion of its functionality through execution of procedures. Concepts stored in OKM 1010 possess a suitability numeric attribute and an inertia numeric attribute, and a situation score attribute derived there from. The semantics of suitability, inertia and situation score is substantially the same as that for self-awareness component 550 and self-conceptualization component 560. Therefore, if a run-data is provided with a lower inertia than step-data, self-optimization component 570 planners (e.g., überbots) are more likely to communicate the concept of run-data from OMK 1010 to optimizing working memory (OWM) 1020. In turn, such inertia relationship between run-data and step-data can increase the activation rate of optimization autobots that work with run related concepts.

It should be noted that through FF links 552 and 562, self-awareness component 550 and self-conceptualization component 560 can influence the situation score of concepts stored on OKM 1010, and the activation energy of optimization autobots through optimization planners (OPs), which can reside in optimization planner component 1050. It should be appreciated that concepts which are stored in OKM 1010, and are influenced through self-awareness component 550 and self-conceptualization component 560, can determine aspects of a specific goal to be optimized as a function of a specific context. As an illustration, if self-awareness component 550 recognizes that a pattern of data for a process step has degraded significantly, the situation score of the associated step concept can be increased. Accordingly, OPs can then supply additional activation energy to optimizing autobots related to the step concept in order to modify a set of steps executed during a process (e.g., while pursuing a goal). Similarly, if self-conceptualization component 560 identifies a new functional relationship among tool measurements for a product lot, FF information received from self-conceptualization component 560 (via FF 562, for example) self-optimization component 570 can increase (1) a situation score of a lot concept and (2) an activation energy of an optimization autobot with a functionality that relies on a lot concept; therefore, modifying aspects of the lot concept (e.g., number or type of wafers in a lot, cost of a lot, resources utilized in a lot, and so on).

Health assessment of a tool system 310 can be performed through diagnosing engine 825 as discussed next. It should be noted that a health assessment can be a sub-goal of a manufacturing process. Diagnosing engine 825 autonomously creates a dependency graph and allows actor 390 to augment the dependency graph. (Such a dependency graph can be regarded as extrinsic data or as intrinsic data.) The causal graph can be conveyed incrementally, according to the dynamics of the process conducted by the tool system 310, and a diagnosis plan that can be devised by the actor 390. For example, a causal graph can show that a "pressure" malfunction is caused by one of four causes: a deposition chamber has a leak, gas flow into the chamber is faulty, exhaust valve angle (which controls the magnitude of gas flow) is faulty, or a pressure sensor is in error. Components of tool system 310 have a priori probabilities of failure (e.g., a chamber leak can occur with probability 0.01, a gas flow can be faulty with probability 0.005, and so on). In addition, actor 390, or self-conceptualization component 560, can define a conditional dependency for pressure malfunction which can be expressed as a conditional probability; e.g., probability of pressure being at fault given that the chamber has a leak can be p(P|leak). Generally, conditional probabilities causally relating sources of tool failure can be provided by actor 390. It should be noted that autonomous learning system 360 assumes that probability assignments defined by actor 390 can be approximate estimates, which in many cases can be significantly different from a physical probability (e.g., actual probability supported by observations). Examples of causal graphs are presented and discussed next in connection with FIGS. 11A and 11B below.

Self-optimization component 570 can also comprise a prognostic component 1060 which can generate a set of prognostics regarding performance of tool system 360 through information I/O 358 associated with the tool 360. Such information can comprise quality of materials employed by functional component, physical properties of product assets 328 produced by tool system 360, such as index of refraction, optical absorption coefficient, or magnetotransport properties in cases product assets 328 are doped with carriers, etc. Multiple techniques can be utilized by prognostics component 1060. The techniques comprise first characterization techniques substantially the same as those techniques that can be employed by self-awareness component when processing information 358; namely, such as (i) frequency analysis utilizing Fourier transforms, Gabor transforms, wavelet decomposition, non-linear filtering based statistical techniques, spectral correlations; (ii) temporal analysis utilizing time dependent spectral properties (which can be measured by sensor component 325), non-linear signal processing techniques such as Poincaré maps and Lyapunov spectrum techniques; (iii) real- or signal-space vector amplitude and angular fluctuation analysis; (iv) anomaly prediction techniques and so forth. Information, or data assets generated through analysis (i), (ii), (iii) or (iv) can be supplemented with predictive techniques such as neural-network inference, fuzzy logic, Bayes network propagation, evolutionary algorithms, like genetic algorithm, data fusion techniques, and so on. The combination of analytic and predictive techniques can be exploited to facilitate optimization of tool system 310 via identification of ailing trends in specific assets, or properties, as probed by sensor component 325, as well as information available in OKM 101, with suitable corrective measures generated by optimization planner component 1050, and optimization autobots that can reside in component 540.

Figure 11A:
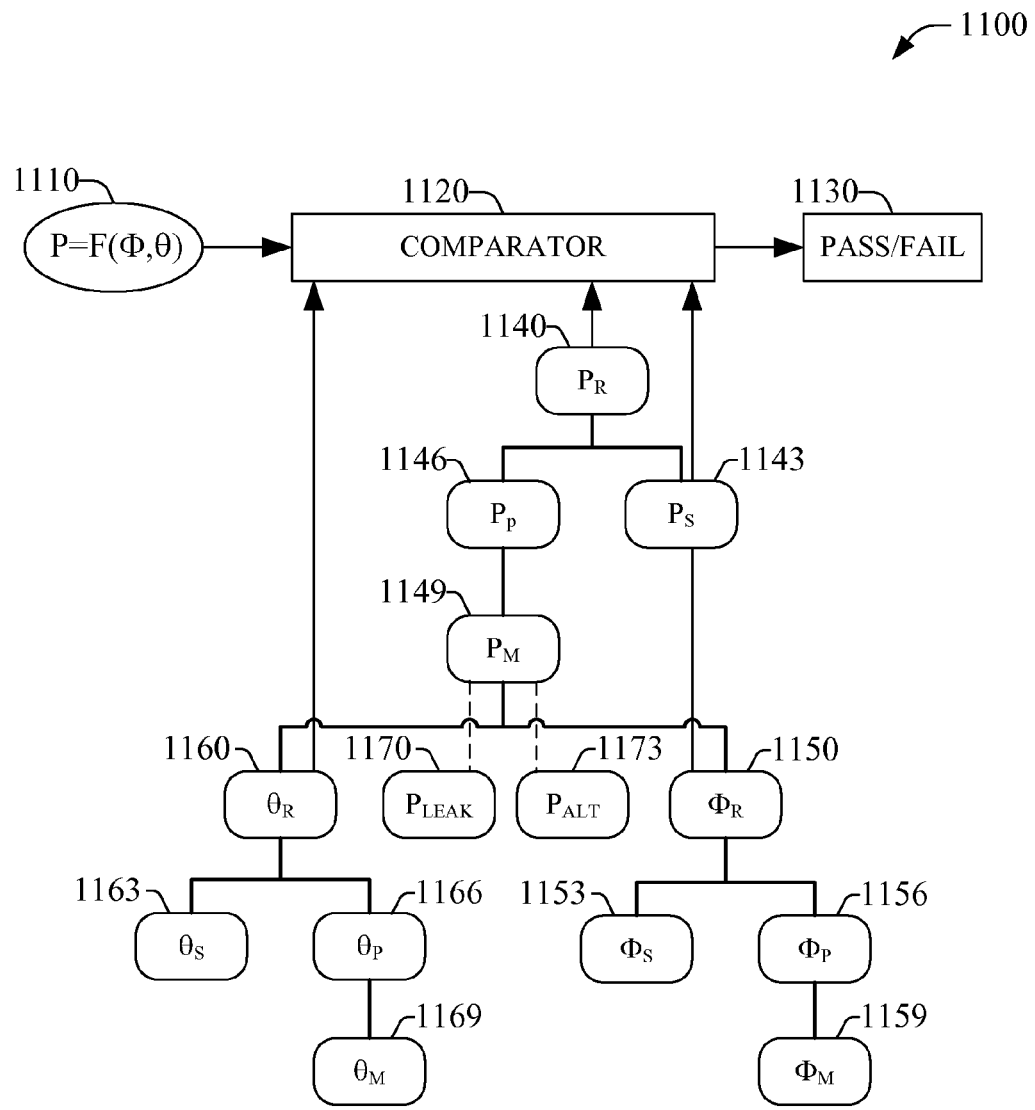
FIGS. 11A and 11B illustrate an example dependency graph with a single prediction comparator and two recipe comparators, respectively, generated according to an aspect of the subject disclosure.

FIG. 11A illustrates an example causal graph 900 generated by self-conceptualization component 530. A causal graph represents a relationship between dependent and independent variables of mathematical function, or relationship, predicted by self-conceptualization component 530. As an example, by accessing data for pressure (P), gas flow ($\Phi$), and valve angle ($\theta$), self-conceptualization component 530 can use one or more mathematical techniques, such as curve fitting, linear regression, genetic algorithm, etc. to conceptualize, or learn, a predictive function 1110 for an output of interest or dependent variable, e.g., pressure, as a function of data inputs or independent variables—gas flow, valve angle, temperature, humidity, etc. An example learnt predictive function 1110 can be the following relationship between pressure and the two input variables $\Phi$, $\theta$: $P=2\pi(\Phi/\theta^3)$. From such a learnt function, self-conceptualization component 530 autonomously constructs the dependency graph 900.

To generate the dependency graph 1100 self-conceptualization component 530 can proceed in two steps. (i) Comparator 1120 is introduced as a root node that receives as input a single learnt function 1110. A failure in comparator 1120 implies a failure in a tool (e.g., tool system 310) that employs a biologically based autonomous learning system. A comparator failure can be a Boolean value (e.g., "PASS/FAIL" 1130) result which can be based on comparing a measured value of the pressure with a predicted value generated through learnt function 1110. Self-conceptualization component 530 flags a failure in comparator 1120 when the average difference between predicted pressure values and collected pressure data (e.g., as reported by a pressure sensor residing in sensor component 378) fails to remain within user-specified bounds—e.g., average difference is to remain within 5% of predicted pressure. A failure of comparator 1120 is made dependent on the output of the predictive function 1110. Thus a comparator failure depends on (is influenced by) the failure of the pressure reading ($P_R$ 1140); which can fail because a pressure sensor ($P_S$ 1143) has failed or a physical pressure (e.g., the physical quantity $P_P$ 1146) has failed. Physical pressure $P_P$ 1146 can fail because a pressure mechanism ($P_M$ 1149) can fail. Thus the system autonomously creates the dependencies between $P_R$ 1140 and $\{P_S$ 1143, $P_P$ 1146$\}$ and between $P_P$ 1140 and $\{P_M$ 1149$\}$.

(ii) Dependent variables in learnt function 1110 are employed to complete the dependency graph as follows. Physical mechanism $P_M$ 1149 can fail when a gas-flow reading ($\Phi_R$ 1150) fails or a valve-angle reading (OR 1160) fails—dependent variables in learnt function 1110. Thus, self-conceptualization component 530 creates dependencies between $P_M$ 1149 and $\{\theta_R$ 1150, $\Phi_R$ 1160$\}$. Substantially the same processing, or reasoning, for a failure in a reading can be employed by self-conceptualization component 530 to create dependencies between $\Phi_R$ 1150 and $\{\Phi_S$ 1153, $\Phi_P$ 1156$\}$ and between $\theta_R$ 1160 and $\{\theta_S$ 1163, $\theta_P$ 1166$\}$. Self-conceptualization component 530 then can add the dependency between $\Phi_P$ 1156 and $\{\Phi_M$ 1159$\}$ and between $\theta_P$ and $\{\theta_M\}$. It is to be noted that the relationship between the physical quantity (e.g., $P_P$ 1146, $\Phi_P$ 1156, $\theta_P$ 1166) and the associated mechanism (e.g., $P_M$ 1149, $\Phi_M$ 1159, and $\theta_M$ 1169) is redundant and presented to enhance clarity—mechanism nodes (e.g., nodes 1149, 1159, and 1169) can be removed, and their children made the children of the associated physical magnitude nodes (e.g., nodes 1146, 1156, and 1169).

In a dependency graph such as dependency graph 900, leaf-level nodes are physical points of failure; e.g., nodes 1140, 1143, 1146, and 1149; nodes 1140, 1153, 1156, and 1159; and 1160, 1163, 1166, and 1169. In an aspect, an actor (e.g., actor 390, which can be a user) can supply a biologically autonomous learning system with a priori probabilities for all physical points of failure. Such a priori probabilities can be obtained from manufacturing specifications for the component, field data, MTBF data, etc., or can be generated by simulation of the performance of parts present in a manufacturing tool and involved in a relevant manufacturing processing. The actor can also supply conditional probabilities based on prior experience, judgment, field data, and possible failure modes (e.g., the presence of a first failure can eliminate the possibility of a second failure, or the first failure can increase the probability of occurrence of the second failure, etc.). Upon receiving a priori and conditional probabilities, for example via an interaction component, such as component 340, the autonomous system can use Bayesian network propagation with learning to update the probabilities based on actual failure data submitted to the autonomous system. Thus, in case the initial probabilities provided by the actor are erroneous, the autonomous system adjusts the probabilities as field data contradicts or supports a failure outcome; namely, a PASS or FAIL result of a comparator.

It should be noted that an actor (e.g., actor 390, which can be a user) can add dependencies to an autonomously generated dependency graph (e.g., dependency graph 900) rooted at mechanism failures. Such an addition can be effected, for instance, through interaction manager 355. In an aspect, as an illustration, dependency graph 1100 is augmented with two nodes labeled $P_{LEAK}$ 1170 and $P_{ALT}$ 1173 that result in a dependency of $P_M$ 1149 on $\{\Phi_R$ 1150, $\theta_R$ 1160, $P_{LEAK}$ 1170, and $P_{ALT}$ 1173$\}$. It is to be appreciated that dependency graph 1100 can be augmented with a deeper graph as well. Addition of node $P_{LEAK}$ 1170 informs the autonomous system, through self-conceptualization component 530, that besides a failure of a gas flow reading or a valve angle reading, the pressure mechanism can also fail should a leak be present in the tool. Node $P_{ALT}$ 1173 is complementary to node 1170 in that it represents the likelihood that mechanisms alternative to a leak results in system failure. Upon addition of a node, or a deeper graph, the actor is to assign a priori probabilities for the node and associated conditional probabilities describing the dependencies.

It should be appreciated that learnt functions can be more complex than the function $P=F(\Phi,\theta)$ discussed above, and can include substantially more independent variables; however, causal graphs can be prepared in substantially the same manner.

Figure 11B:
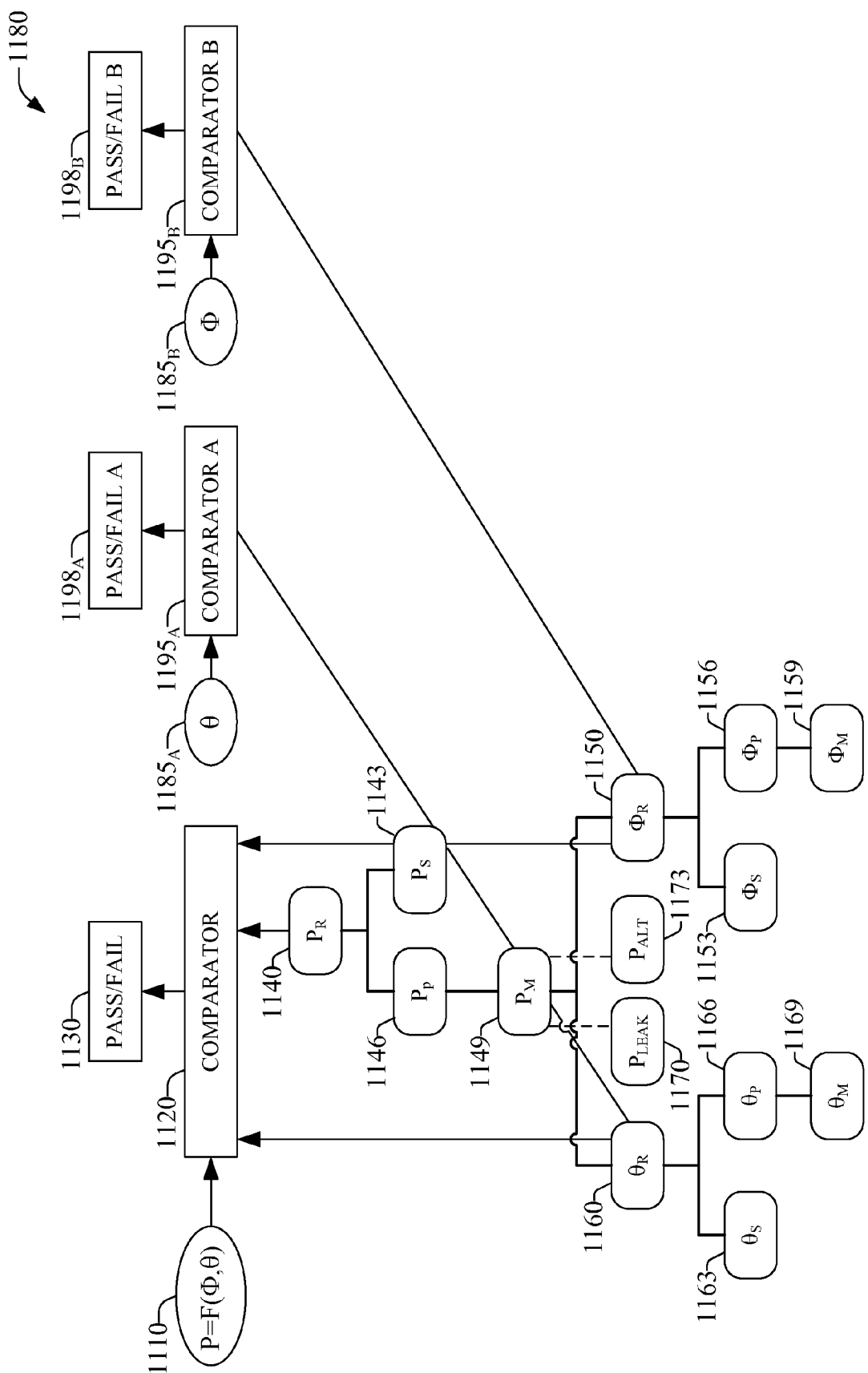

FIG. 11B is a diagram 1180 of an example learnt function dependency graph with prediction and recipe comparators. In addition to learnt-function comparators (e.g., comparator 1120), a biologically based autonomous learning system can generate one or more recipe comparators. A recipe comparator (e.g., comparator A $1195_A$ or comparator B $1195_B$) compares a set value of a recipe parameter with a corresponding average measure value, or reading, that arises from an associated sensor in a tool system (e.g., tool system 370). In an aspect, given a collection of recipe parameters (e.g., $\theta$ $1185_A$ or $\Phi 1185_B$) that have an associated sensor and corresponding prescribed values, the autonomous system generates a recipe comparator for each set parameter. Similarly to a predicted function comparator, if the set recipe value and the reading differ by a specific threshold which can be determined by an actor (e.g., actor 190), the recipe comparator signals failure. It should be noted that in diagram 1180 a recipe comparator for pressure is not generated since a process pressure is not set to a specific value.

In order to identify a root cause, e.g., the physical point of failure with the highest probability of failure, a biologically based autonomous learning system can utilize a failure of one or more predictor or recipe comparators to rank all physical points of failure present in a dependency graph. In an aspect, for a complete dependency graph with one or more comparators, the biologically based autonomous learning system can use Bayesian inference to propagate the probabilities given the failure signature of the comparators. Thus the system can compute the probability of failure for a particular PASS/FAIL outcome (e.g., outcome $1198_A$ for comparator A $1195_A$ or outcome $1198_B$ for comparator B $1195_B$) for each comparator. As an example, suppose that predictor comparator 1120 and recipe comparator A $1195_A$ fail whereas comparator B $1195_B$ passes. The autonomous system can compute the failure probability for each physical point of failure given the comparator failures. (For example what is the probability of the pressure sensor failure given that comparator $1195_A$ and comparator A $1195_A$ fail whereas comparator B $1195_B$ passes). Each point of failure is then ordered from most likely to fail (highest computed probability), or the most likely root cause, to least likely to fail (lowest computed probability). Identification of a root cause, which can be deemed as actionable intelligence (e.g., output 140), can be conveyed to an actor via an interaction manager for further process; e.g., order a new part, request a maintenance service (an actor communicates with or resides in the tool's manufacturer location), download a software update, schedule a new training session, and the like.

Figure 12:
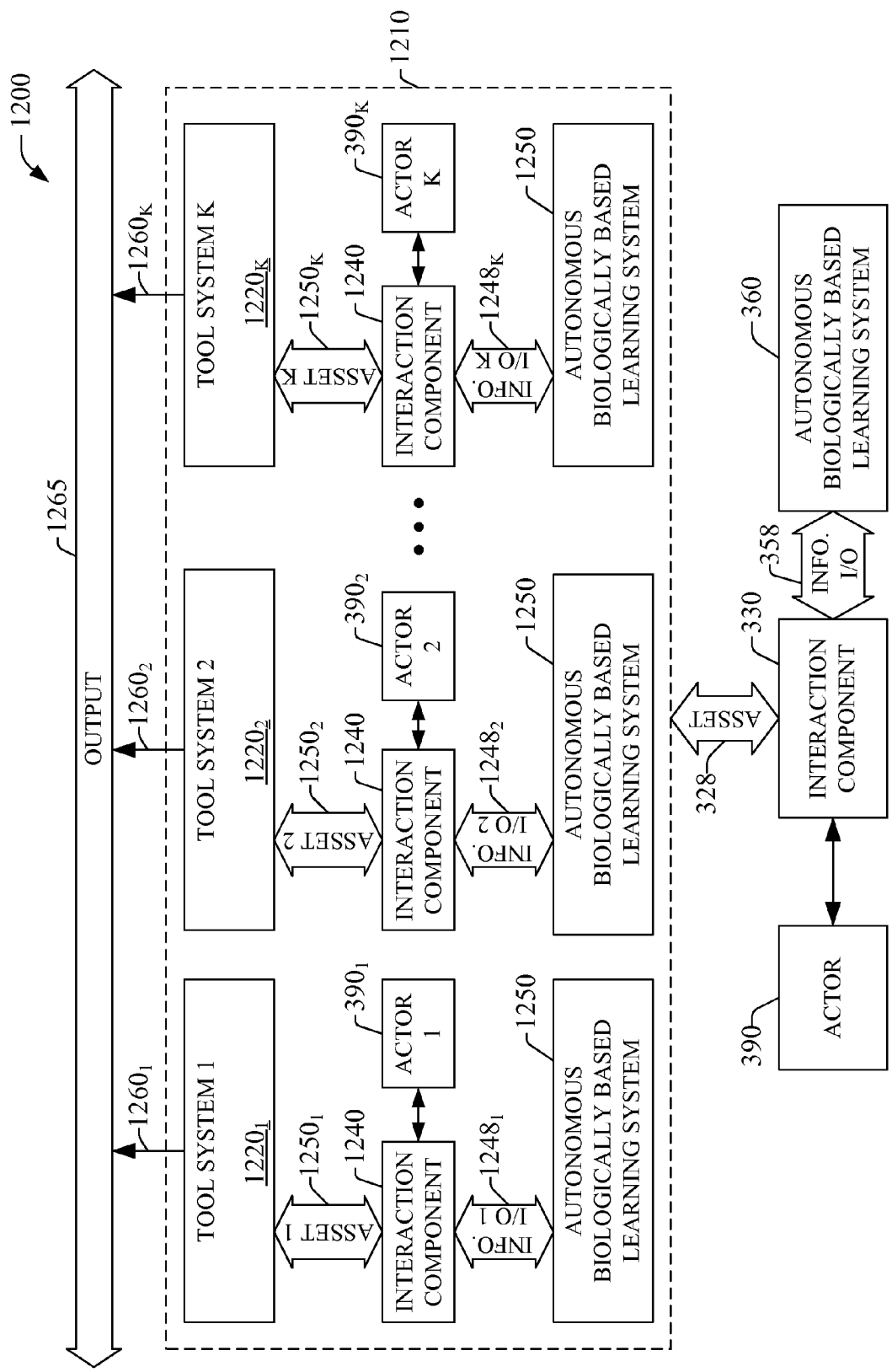
FIG. 12 illustrates a diagram of an example group deployment of autonomous biologically based learning tool systems in accordance with aspects described herein.

FIG. 12 illustrates a high level block diagram 1200 of an example group deployment of autonomous biologically based learning tool systems. The group of autonomous tools systems $1220_1$-$1220_K$ can be controlled by an autonomous biologically based learning tool 360 which receives (input) and conveys (output) information 358 to an interface 330 that facilitates an actor 390 to interact with the group of autonomous tools system $1220_1$-$1220_K$ and with autonomous learning system 360. Individually, each of the autonomous tool systems $1220_1$-$1220_K$ are supported, or assisted, by associated autonomous learning systems 1250. Such learning system possesses substantially the same functionality of learning system 360. It should be appreciated that in group 1210 each of autonomous tools $1220_1$-$1220_K$ can afford independent interaction, respectively, with associated local actors $390_1$-$390_K$. Such actor possesses substantially the same functionality than actor 390, as discussed in connection with FIG. 3 above. Additionally, an interaction with autonomous tools $1220_1$-$1220_K$ takes place in substantially the same manner as in autonomous system 300, through an interaction component 1240 and by providing and receiving tool-specific information (e.g., $1248_1$-$1248_K$) and assets, which both are typically tools system specific (e.g., assets $1250_1$-$1250_K$). In particular, it should be appreciated that in group deployment 1212, each of actors $390_1$-$390_K$ can monitor disparate aspects of operation its associated system tool (e.g., system tool $1220_2$). As an example, local actors $390_1$-$390_K$ can establish a set of specific outputs (e.g., $1260_1$-$1260_K$) to be critical. Such a determination can be based on historic data or design (e.g., recipe for a process), or it can originate autonomously through generated patterns, structures, relationships and the like. In absence of such a determination, group autonomous learning system 360 assumes substantially all outputs (e.g., $1260_1$-$1260_K$) leading to group output 1265 are critical.

In an aspect, autonomous learning system 360 can learn (through learning mechanisms described above in connection with system 300) expected values for the critical output parameters during normal (e.g., non-faulty) group tool 1200 operation. In an aspect, when measured output 1265 deviates from an expected output, autonomous learning system 360 can identify a performance metric of group 1200 performance as degraded. It should be appreciated that the latter assessment can proceed in substantially the same manner as described in connection with single autonomous tool system 300; namely, through a self-awareness component in autonomous learning system 360. It is to be noted that even though autonomous group tool 1200 can present a degraded performance, a subset of autonomous tool system 12201-1220K can provide output that is not degraded and meet individual expectation values for a predetermined metric.

In addition, similarly to the scenario of a single tool system (e.g., tool system 310), autonomous learning system 360 can construct a predictive model for a critical output parameter as a function of individual tool related output parameters. It should be appreciated that such output parameters can be collected through asset 328 input/output. It is to be noted that in group tool 1200, measurements of tool output (e.g., $1260_1$-$1260_K$) can be available to autonomous biologically based learning system 360 via sensor components residing in each of tool systems $1220_1$-$1220_K$, which can be accessed through deployed knowledge network extant in each autonomous learning system (e.g., 360, or 1250).

Furthermore, the autonomous system 360 can also construct a predictive model of group time-to-failure as a function of assets 328 of group 1200; e.g., group input data, group outputs, group recipes, or group maintenance activities. In an aspect, to determine a group time-to-failure, autonomous learning system 360 can gather failure data, including time between detected (e.g., through a set of sensor components) failures, associated assets $1250_1$-$1250_K$, outputs 12601-1260K, and maintenance activities for substantially all operation tools in the set of tools 12201-1220K. (It should be appreciated that as a consequence of prior failure assessments, specific tools (e.g., tool system 2 $1220_1$ and tool system K $1220_K$) in the set of tools (e.g., tools $1220_1$-$1220_K$) in group 1200 can be out of operation.) Collected data can be autonomously analyzed (e.g., through a processing component 385 in autonomous learning system 360) to learn a predictive function for time-to-failure as a function of the group assets (e.g., inputs, recipes, . . . ), outputs, and maintenance activities. It should be appreciated that the group time-to-failure model constructed from the collected data can readily display substantially dominant factors that impact performance of group tool 1200.

In an aspect, time-to-failure models constructed for individual components of tool systems (e.g., $1220_1$-$1220_K$) in group tool 1200 can be employed by actor 390 (e.g., a group level controller) to optimize part inventory and optimize maintenance scheduling. It should be appreciated that such optimization can be conducted, at least in part, by autonomous system 360. For example, the autonomous system accesses the MES (or ERP) system to identify the number of available parts. When a set of parts that provide functionality to tool systems $1220_1$-$1220_K$ (e.g., parts in one or more of components within a functional component like a component 315 in system 310), and can be expected to be necessary (e.g., for replacement) within a specific time period Δτ, exceeds an available supply in stock, additional parts can be ordered. Alternatively, or in addition, when parts are available, an expected schedule of necessary parts can be analyzed to determine an optimal, or adequate, time to place a new order.

It should be appreciated that maintenance schedules can be reassessed and optimized during a necessary, previously scheduled, maintenance activity, in order to exploit an opportunity available to autonomous system 360 to analyze parts and identify parts that can fail in a substantially short period of time. It should further be appreciated that a group or individual time-to-failure schedule can be complemented, autonomously in an aspect, with additional information such as cost of parts, time to replace parts, and so forth, to determine whether replacement of a part during a current maintenance cycle is beneficial with respect to the replacement of the part in a forthcoming scheduled maintenance cycle. It is noted that autonomous system 360 can also take as input various costs associated with the operation of group tool 1200 in order to compute a cost per output product (e.g., a wafer, a car, a computer, etc.) for the group, and a total cost to produce a specific order during operation of the group tool 1200. After building a model of cost as a function of individual tool assets $1250_1$-$1250_K$ (e.g., recipes), outputs $1260_1$-$1260_K$, and maintenance activities, autonomous system 360 can rank individual tool systems $1220_1$-$1220_K$ in increasing order of operation cost. A combined cost data asset can be utilized construct a predictive model of cost versus assets, outputs, and maintenance activities associated with the individual tool systems—for example, such an assessment can identify operational assets and variables that affect substantially an operation or maintenance cost for the group tool. In an aspect, autonomous system 360 can utilize available historic data assets to redesign a production line, or equipment configuration in a floor plant, in order to minimize costs. In addition, during such an optimization process, autonomous system 360 can rely on shutdown of various tool systems in order to exploit alternative patterns of operation. Furthermore, autonomous system 360 can utilize cost-benefit analysis to determine a set of trade-off scenarios in which production of specific output proceeds without output for specific, highly costly tool systems.

Tools system $1220_1$-$1220_K$ can be substantially the same, or can be disparate (e.g., tool systems $1220_1$-$1220_3$ are steppers, tool $1220_j$ is a stepper, and 1220K-4-1220K are turbo-molecular vacuum pumps). Typically, a central difference amongst homogeneous (e.g., tool systems are alike) and heterogeneous (e.g., tools are disparate) can lie in that input and output measurements (e.g., measurement assets) are distinct. For example, a critical output of interest for tool group 1200 can be D1 CD uniformity, but a coating system that is part of the group tool 1200 can fail to provide such output measurements. Accordingly, autonomous system 360 can construct a model for expressing a tool group's outputs as a function of individual tool (e.g., $1220_1$-$1220_K$) outputs. Thus, when a group performance appears degraded, individual performances associated with individual tools can be analyzed to isolate a tool that has the largest weight in causing the performance degradation.

Figure 13:
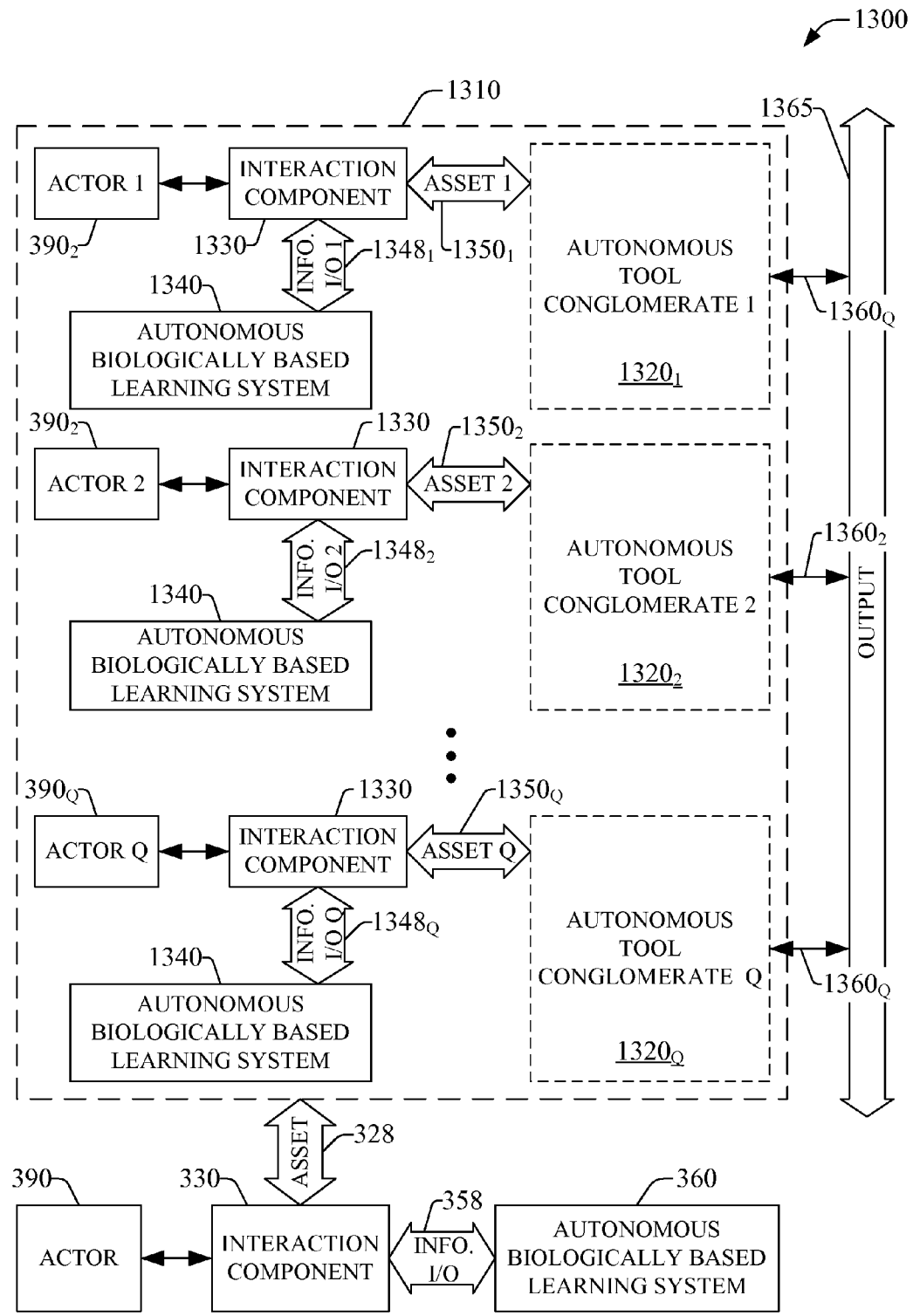
FIG. 13 illustrates a diagram of a conglomerate deployment of autonomous tool systems according to aspects described herein.

FIG. 13 illustrates a diagram of a conglomerate deployment of autonomous tool systems. Conglomerate system 1310 comprises a set of autonomous tool conglomerates $1320_1$-$1320_Q$. Each of the tool conglomerates can comprise homogeneous or heterogeneous groups of autonomous tools, e.g., a set of disparate autonomous tools groups which can comprise am autonomous fabrication facility (not shown), or a set of disparate autonomous fabrication facilities. It should be appreciated that autonomous conglomerates $1320_1$-$1320_Q$ can typically be located in disparate geographic locations (for example, a conglomerate can represent a car assembly line that mounts vehicles with parts fabricated in a disparate location). Similarly, groups of autonomous tools in a factory can be deployed in disparate locations within a plant in view that a manufacturing process can comprise multiple steps. Accordingly, product output chain 1365 can facilitate providing disparate autonomous tool conglomerates $1320_1$-$1320_Q$ with partially manufactured or processed or analyzed products; such features indicated with bidirectional arrows $1360_1$-$1360_Q$ which represent output/input associated with conglomerates $1320_1$-$1320_Q$.

Conglomerate system 1310 can be autonomously supported by an autonomous learning system comprising an interaction component 340, an actor 390, and an autonomous learning system 360. In an aspect, autonomous support can be directed toward improving an overall fabrication effectiveness (OFE) metric of output assets (e.g., output 1365 or 1265). In addition, each of the autonomous tool conglomerates $1320_1$-$1320_Q$ can be in turn autonomously supported by an interaction component 1330, and an autonomous learning system 1340. Interface component 1330 facilitates interaction between autonomous learning system 1340 and actors $390_1$-$390_Q$. Functionality of each of such components is substantially the same as the functionality of respective component described above in connection with system 360 and system 1200. Information 1348, (I=1, 2, . . . , Q) communicated among interaction component 1330 and autonomous system 1340 is associated with the respective autonomous tool conglomerate I $1320_I$. Similarly, assets $1350_I$ conveyed to and received from an autonomous tool conglomerate I $1320_I$ are specific thereof.

To address performance in an autonomous tool conglomerate $1310_1$-$1310_Q$, the multi-step characteristics of a fabrication process can be incorporated through a performance tag that identifies products utilizing a composite conglomerate index $C_\alpha$, wherein the index $\alpha$ indicates a specific tool group within conglomerate C (e.g., autonomous conglomerate $1320_Q$), and a run index (R); thus, a product quality, or performance metric associated with a specific product is identified via a label ($C_\alpha$;R), which can be termed "group-layer output." Such label facilitates identifying each autonomous operation group as an individual component $C_\alpha$. Therefore, autonomous system 360 can map quality and performance metrics as a function of fabrication conglomerate (e.g., autonomous tool conglomerate $1310_2$) and as a function of tool group within each fabrication conglomerate. The latter facilitates root-cause analysis of poor performance or quality, by first identifying a conglomerate (e.g., a fabrication facility) and subsequently performing the analysis for the tool associated with the assessed degradation. It should be appreciated that index $C_\alpha$ to account for the fact that output assets generated in an autonomous system comprised of multiple conglomerate tools can be transported from a first conglomerate (N) to a second conglomerate (N'). Thus, the composite symbol for tracking performance associated with a transfer of assets (e.g., as a part of a multi-step fabrication process) can read $C_{\alpha:N \to N'}$.

Performance of an autonomous tool conglomerate can be performed as a function of product yield. Such yield is utilized to rank disparate conglomerates. In an aspect, autonomous learning system 360 can develop a model for yield based at least in part on output assets from each autonomous tool, or autonomous group tool. For example, for tools, or group of tools, employed in semiconductor manufacturing, yield can be expressed as a function of a wafer thickness, a device uniformity, an impurity (e.g., extrinsic and intrinsic dopant concentration) concentration, a DI CD, an FI CD, and so on. Moreover, other yield metrics can be utilized to determine a model for a yield, specially in an autonomous learning systems comprising tool conglomerates systems (e.g., $1320_1$-$1320_Q$) wherein output assets can be transported among conglomerates: an overall equipment efficiency (OEE), a cycle time efficiency, an on-time-delivery rate, a capacity utilization rate, a rework rate, a mechanical line yield, a probe yield and final test yield, an asset production volume, a startup or ramp-up performance rate, etc. It is to be noted that an autonomous system that supports operation of a set of autonomous tool conglomerates can autonomously identify relationships amongst yield metrics in order to redesign processes or communicate with actors $390_1$-$390_Q$ with respect to adjustments in connection to said yield metrics.

The yield function mentioned supra can be analyzed through a combination of static and dynamic analysis (e.g., simulation) to rank group layer outputs according to degree of influence, or weight, in leading to a specific yield. It is to be noted that ranking tools, group of tools, or conglomerates, at a group-layer-output level based at least in part on influence in affecting asset output, or yield, can afford a group or conglomerate autonomous learning system 360 to autonomously identify, through autonomous systems associated with each of the tools in a group or group in a conglomerate, whether a specific tool can be isolated as a dominant tool in yield deterioration. When such a tool is located, the group or conglomerate level autonomous system 360 can issue an alarm to a maintenance department with information regarding ranking the faults that can be candidates for performance degradation.

In addition, yield for the lowest ranking autonomous tool conglomerate can be employed to identify the group layer outputs of the tool group that is dominant in its impact on yield. The time-to-failure for such tool-group can be compared with substantially the same tool groups in disparate autonomous conglomerates in order to identify cause(s) of poor performance. Furthermore, an autonomous tool conglomerate system ranks tools within a specific tool group in disparate tool conglomerates. It is to be noted that an autonomous learning system that supports and analyzes a group of autonomous tool conglomerates (e.g., $1320_1$-$1320_Q$) can rank each of the conglomerates according to inferred time-to-failure for each conglomerate. Since time-to-failure can change over operational time intervals in view of, e.g., input/output asset (e.g., asset 358) load, a database with time-to-failure projection can be updated at specified periods of time (e.g., weekly, monthly, quarterly, or yearly).

Further yet, when an individual tool that is primarily responsible for a group tool's poor performance (e.g., the tool ranks the lowest in performance within a group tool, such as a tool that most frequently fails to output assets with specified target properties of quality like uniform doping concentration or uniform surface reflection coefficient) is identified, an autonomous system associated with the lowest performing tool, or with the conglomerate system that includes such poor performing tool, can analyze the tool's outputs to identify those outputs that most significantly affect the output of the lowest performing group. For example, a tool in a tool group or conglomerate that outputs assets with low uniformity as illustrates above, can lead to a substantial percentage (e.g., 60%) of tool groups uniformity variation (for example, variation in uniformity change of surface reflectivity of an optical display due to uniformity issues on surface reflectivity of coatings on otherwise high-quality displays). To that end, in an aspect, for each output in the group the tool autonomous system constructs a function that expresses tool output as a function of tool assets (e.g., inputs, recipes, and process parameters, tool operator or actor, and so on). This model is then analyzed to identify the dominant factors in poor performance. It is to be noted that an autonomous system can identify best performing tools in a group tool and analyze causes that result in the tool having the best performance; e.g., the vacuum level of the tool during operation is consistently lower than vacuum level of disparate tools in the group tool, or during epitaxial deposition a wafer in the best performing tool rotates at a lower speed than in disparate tool carrying out a deposition, thus the tool consistently achieves greater device quality. Such factors in highest ranking and lowest ranking tools can be compared with same parameters in other tools in conglomerate system. In case the comparison indicates that the factors identified as the root causes of highest and lowest ranking performance appear to be substantially the same throughout the tool conglomerate system, then a new model can be developed and alternative root causes can be identified. Such iterative, autonomous processes of model development and validation can continue until root causes are identified and best practices are emulated (e.g., a coating recipe utilized in tool conglomerate $1320_P$ is adopted in substantially all tool conglomerates in view that it increases output asset performance by a specific, desirable margin) and root causes for low performance are mitigated (e.g., abandoning a specific brand of paint whose viscosity at the operating temperature of a painting tunnel results in non-uniform coloration of painted products). Ranking of tools, group of tools, or conglomerate of tools is autonomous and proceeds in substantially the same manner as in a single autonomous tool system (e.g., system 360). Autonomous systems that support operation of a conglomerate of autonomous tools considers such autonomous conglomerates as a single component regardless of the complexity of its internal structure, which can be accessed and managed through an autonomous system associated with the conglomerate.

Figure 14:
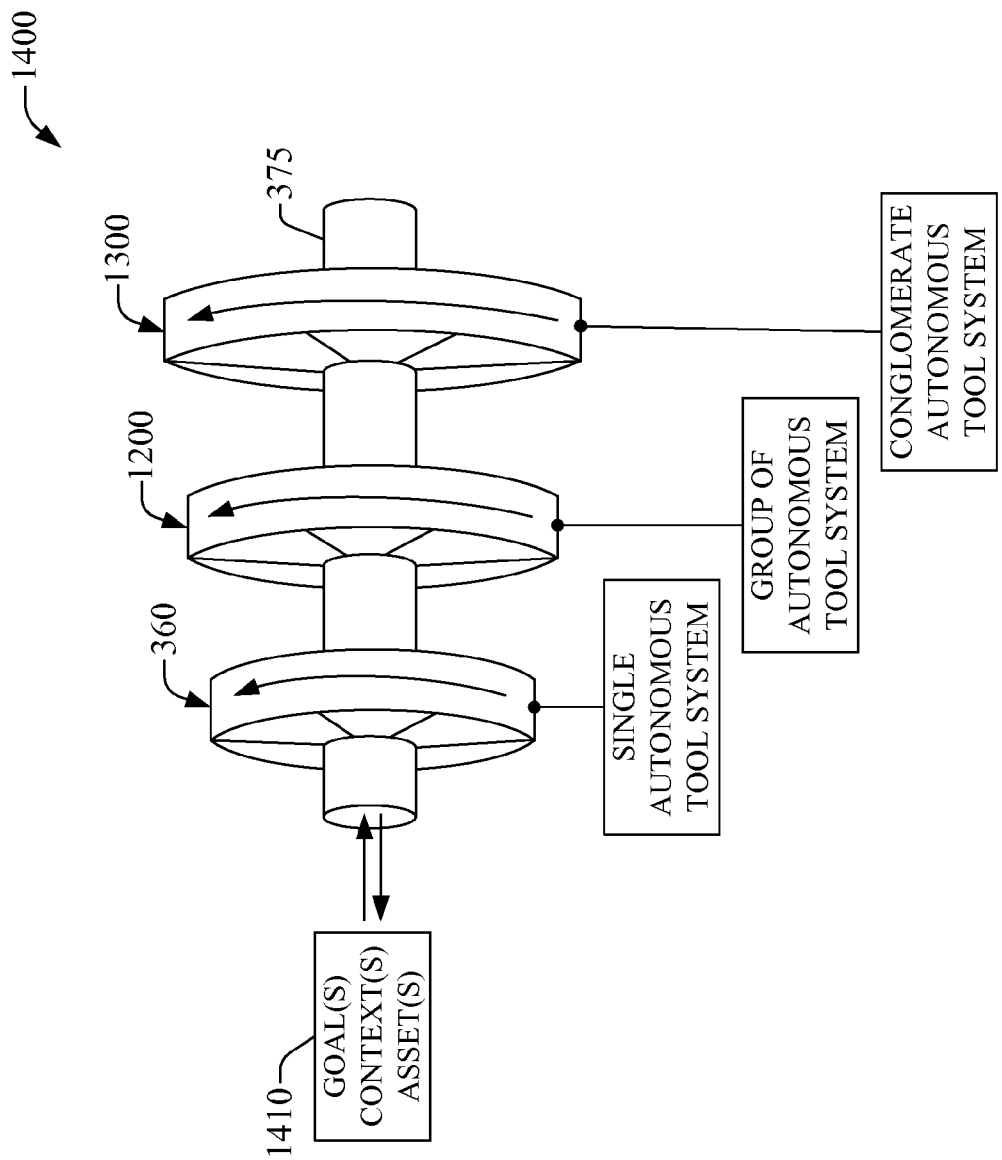
FIG. 14 illustrates the modular and recursively-coupled characters of autonomous tool systems described in the subject specification.

FIG. 14 is a diagram 1400 that illustrates the modularity and recursive coupling among classes of tools systems described above—e.g., individual autonomous tool 360, autonomous group tool 1200, and autonomous conglomerate tool 1300. In autonomous system 1400, goals, contexts, and assets circulate through knowledge network 375 which is depicted as an axial gateway, and are conveyed to disparate autonomous tool systems 360, 1200 and 1300. Such information and assets are acted upon in each autonomous system, acts can include analysis, modification, generation of new information and assets; such acts are pictorially depicted as an arrow on the outer belt of each representation of autonomous systems 360, 1200, 1300. Processed and generated assets are conveyed to the knowledge network 375, where can be circulated among autonomous system. In diagram 1400, processing and generation of assets is represented as occurring azimuthally, whereas communication of assets is a radial process. As diagram 1400 depicts, autonomous tool systems are based on substantially the same elements that function in substantially the same manner.

Figure 15:
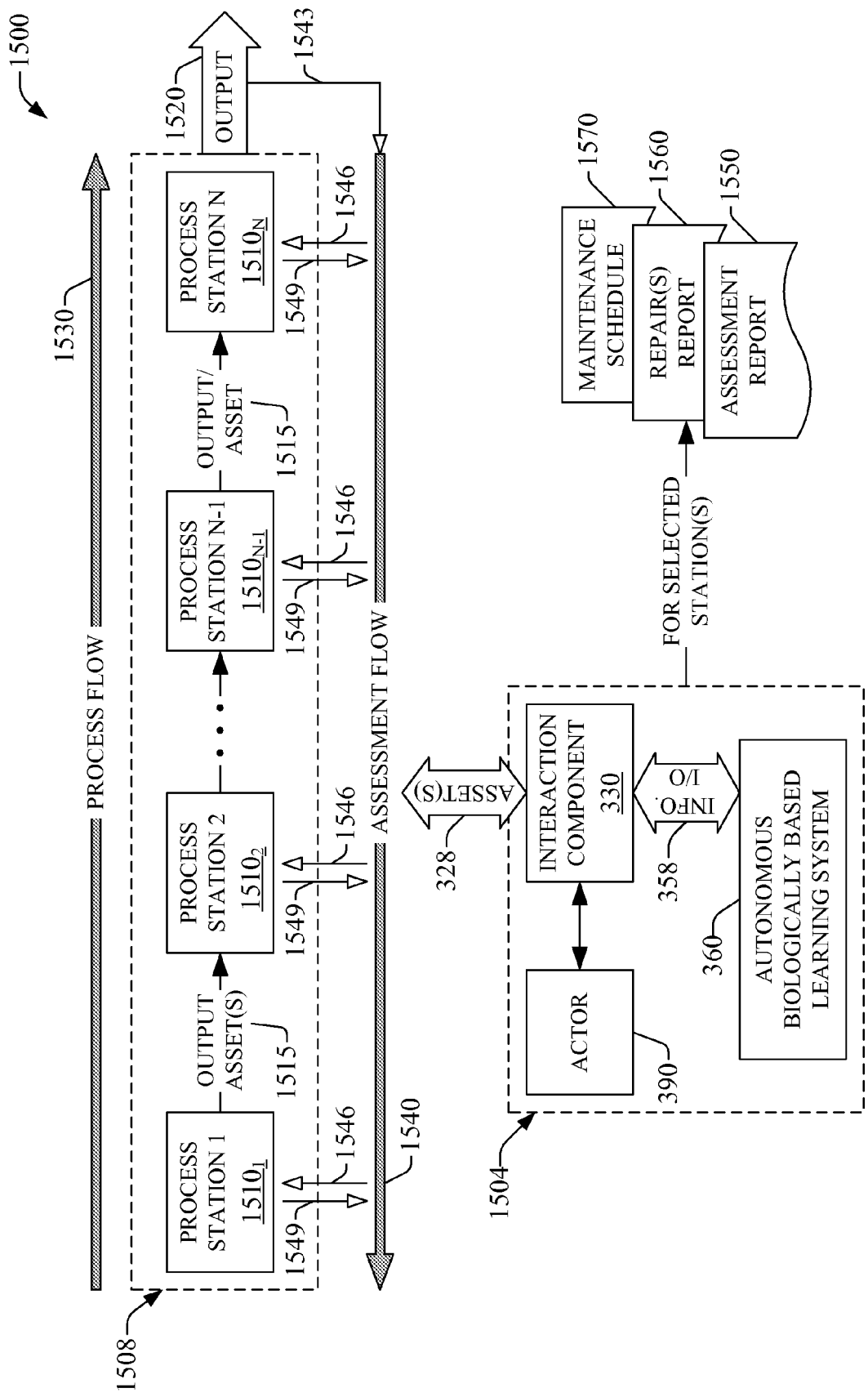
FIG. 15 illustrates an example system that assesses, and reports on, a multi-station process for asset generation in accordance with aspects described herein.

FIG. 15 illustrates an example system 1500 that assesses, and reports on, a multi-station process for asset generation. An autonomous system 1505 that comprises an autonomous biologically based learning system 360, an actor 390, and associated interaction component 330 can receive and convey asset(s) 328 that originate in an N-station process 1510, and assess performance through backward chaining. The N-station process is effected through a set of N process stations $1510_1$-$1510_N$ that produce an output 1520 and can include individual autonomous tools 360, autonomous tool groups 1220, or autonomous tool conglomerates 1320. As a result of performance assessment(s), autonomous system 1508 can locate tools, or group of tools, in process stations $1510_1$-$1510_N$ with specific degrees of performance degradation. In addition, for the selected station, autonomous system 1508 can provide an assessment report, a repair(s) report, or a maintenance schedule. It should be appreciated that disparate process stations can perform substantially the same operations; such a scenario would reflect the situation in which an output asset 1515 returns to a specific tool, or tool group, for further processing after the asset 1515 has been generated and transported to a disparate tool, or group of tools, for further processing.

In backward chaining, action flow (e.g., process flow 1530) which leads to an output typically counters a probe flow (e.g., assessment flow 1540) which typically assesses the action flow. Thus, assessment generally takes place in a top-bottom manner, in which assessment is conducted on a high-level stage of a specific action, e.g., a finalized asset output 1520, and proceeds to lower-level stages in a quest to focus the assessment on a specific stage prior to completion of a specific action. As applied by autonomous system 1504, output asset 1520 is received via process station N $1510_N$. The autonomous system 1504 can evaluate, as illustrated by 1546, a set of performance metrics $\{P_{N-1 \rightarrow N}^{(C)}\}$ leading to a specific degradation vector (not shown), based at least in part on a expected performance, for substantially all operational components (e.g., tool, group or conglomerate tool) in the process station $1510_N$. Additionally, it should be appreciated that in process 1530, output assets (e.g., assets 1515) can be transported across disparate geographical areas, therefore the degradation vector assessed by autonomous system 1504 can comprise metrics associated with the in-transit portion of the process that leads to a partially finished asset 1515. For example, when process 1530 regards accelerometers for vehicular airbag deployment, mechanical pieces in a transported accelerometer can be damaged as a consequence of utilizing an alternative route for transporting the accelerometers rather than employing a route disclosed in the process 1530. When result(s) 1549 of such an assessment indicate that N-station output 1520 is faulty, autonomous system 1504 isolates a faulty tool, or group of tools, associated with process station N, and generates a report (e.g., assessment report 1550, repair(s) report 1560, or maintenance schedule 1570). The generated report(s) can contain information to be utilized by one or more actors (e.g., actors $390_1$-$390_Q$). In addition, reports can be stored to create a legacy of solutions (or "fixes") for specific issues with performance, especially issues that appear infrequently so that an actor's intervention can be preferred with respect to an autonomously developed solution which typically can benefit from extensively available data. Moreover, availability of reports can facilitate failure simulations or forensic analysis of a failure episode, which can reduce manufacturing costs in at least two levels: (a) costly, infrequently failing equipment can be predicted to fail under rare conditions, which can be simulated by autonomous system 360, arising from operation of equipment by an actor with a background non-commensurate with the complexity of the equipment, (b) optimization of parts inventory through prediction of various failure scenarios based at least in part on historical data stored in assessment reports 1550 and repair reports 1560.

In case results 1549 of process station N $1510_N$ yield no faulty tool, or group of tools, assessment is performed on a lower-level process station N−1 $1510_{N-1}$ that generates a partially processed output asset 1515, and is a part in the process cycle 1530 to generate output 1520. Through analysis of a set of disparate performance metrics $\{P_{N-2 \to N-1}^{(C)}\}$, a degree of degradation can be extracted and associated tool, or group of tools (e.g., conglomerate C) can be located. In instances that no faulty conglomerate of autonomous tools, or group of autonomous tools, or individual autonomous tool, autonomous system 1504 continues the backward, top-bottom assessment flow 1540 with the object to locate sources of poor performance in final output 1520.

Figure 16:
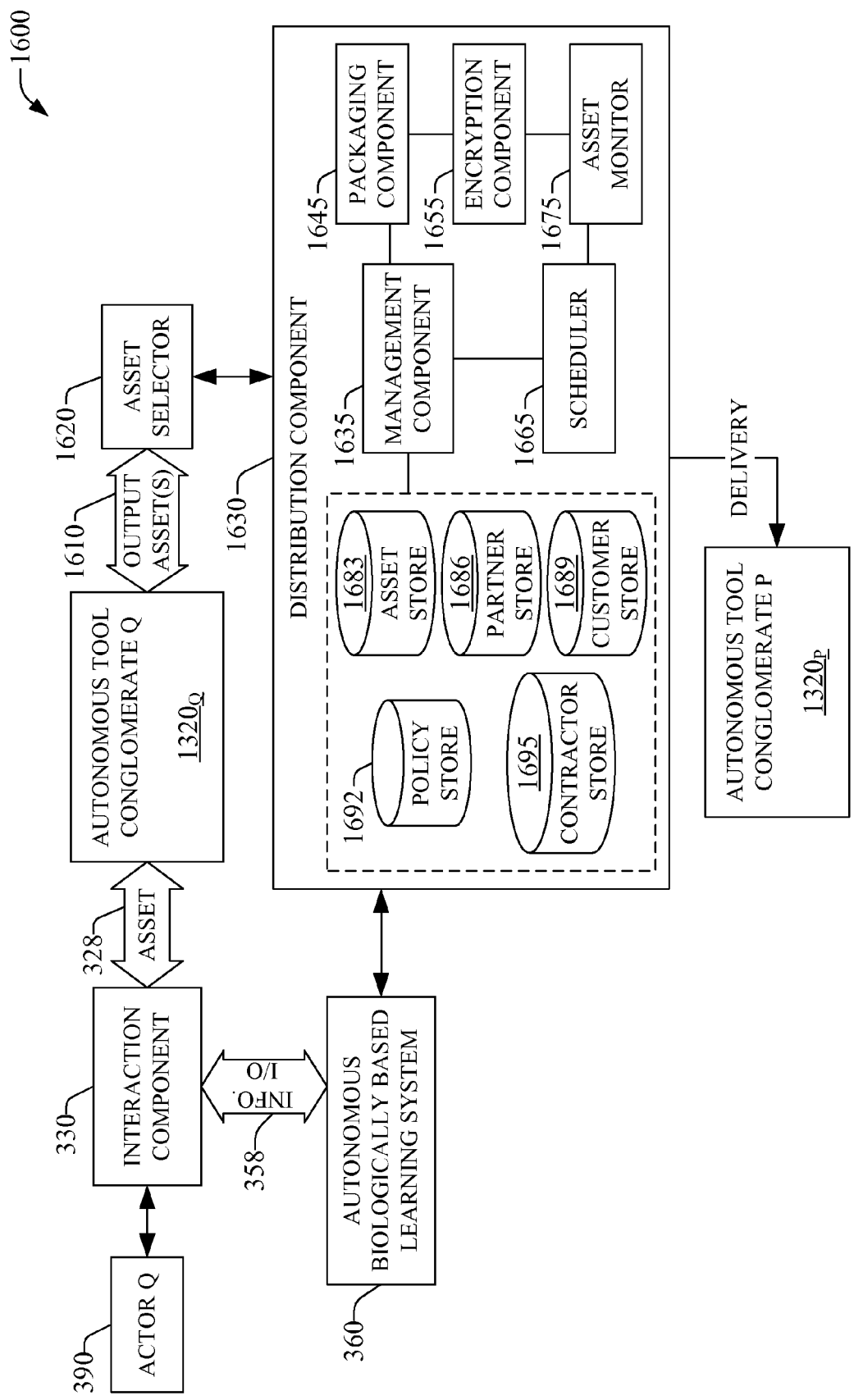
FIG. 16 is a block diagram of an example autonomous system which can distribute output assets that are autonomously generated by a tool conglomerate system in accordance with aspects set forth herein.

FIG. 16 is a block diagram of an example autonomous system 1600 which can distribute output assets that are autonomously generated by a tool conglomerate system. In system 1600, tool conglomerate $1320_Q$ can autonomously generate a set of output assets 1610, which can be (i) information (e.g., structures and data patterns, relationships among measured variables like a remedy to an existing degradation episode or condition in alike or disparate tool groups that compose the autonomous tool conglomerate $1320_Q$, and the like) gleaned or inferred about a state, including a performance degradation condition, of one or more tools that can compose tool conglomerate system $1320_Q$; or (ii) an output product fabricated by said conglomerate. In addition, in system 1600 output assets 1620 can be filtered by an asset selector 1620 and conveyed, or communicated, to a distribution component 1630. Such distribution component 1630 can exploit intelligent aspects of autonomous biologically based learning system 360. The distribution component 1630 comprises a management component 1635 that can manipulate a packaging component 1645 and an encryption component 1655 that can prepare the data, as well as a scheduler 1665 and an asset monitor 1675. Packaging component 1645 can prepare the asset to be distributed for a distribution process; such preparation can include damage prevention as well lost prevention. For information (e.g., an event in episodic memory 530 such as a system unwanted condition that develops as a result of operation outside a part specification like an temperature above a threshold) or data assets, packaging component 1645 can alter specific formats to present the information depending, at least partially, on the intended recipient of the asset to be distributed. For example, proprietary information can be abstract and presented without specificity (e.g., explicit names of gases can be replaced with the word "gas;" relationships among specific parameters can be generalized to a relationship among variables such "$p(O_2)<10^{-8}$ Torr" can be packaged as "$p(gas)<10^{-8}$ Torr.") In addition, packaging component 1645 can exploit an encryption component 1655 to ensure information integrity during asset transmission and asset recovery at the intended recipient.

Additionally, in an aspect, management component 1635 can access (i) an asset store 1683, which typically contains assets scheduled to be distributed or assets that have been distributed; (ii) a partner store 1686 comprising commercial partners associated in the distribution or completion of specific assets; (iii) a customer store 1689 which can contain current, past, or prospective customers to which the selected asset has been, or can be distributed; (iv) a policy store that can determine aspects associated to the distribution of assets, such as licensing, customer support and relationships, procedures for asset packaging, scheduling procedures, enforcement of intellectual property rights, and so on. It should be appreciated that information contained in policy store can change dynamically based at least in part on knowledge, e.g., information asset, learned or generated by autonomous biologically based learning system.

Once an asset has been packaged, which can include adding to a package a monitoring device like RFID tags, either active or passive, or bar codes (e.g., two-dimensional codes, Aztec codes, etc.), and it has been scheduled for distribution, a record of distribution can be stored, or if the asset is a data asset then a copy of the asset can be stored. Then, the asset can be delivered to a disparate autonomous tool conglomerate P $1320_P$.

Figure 17:
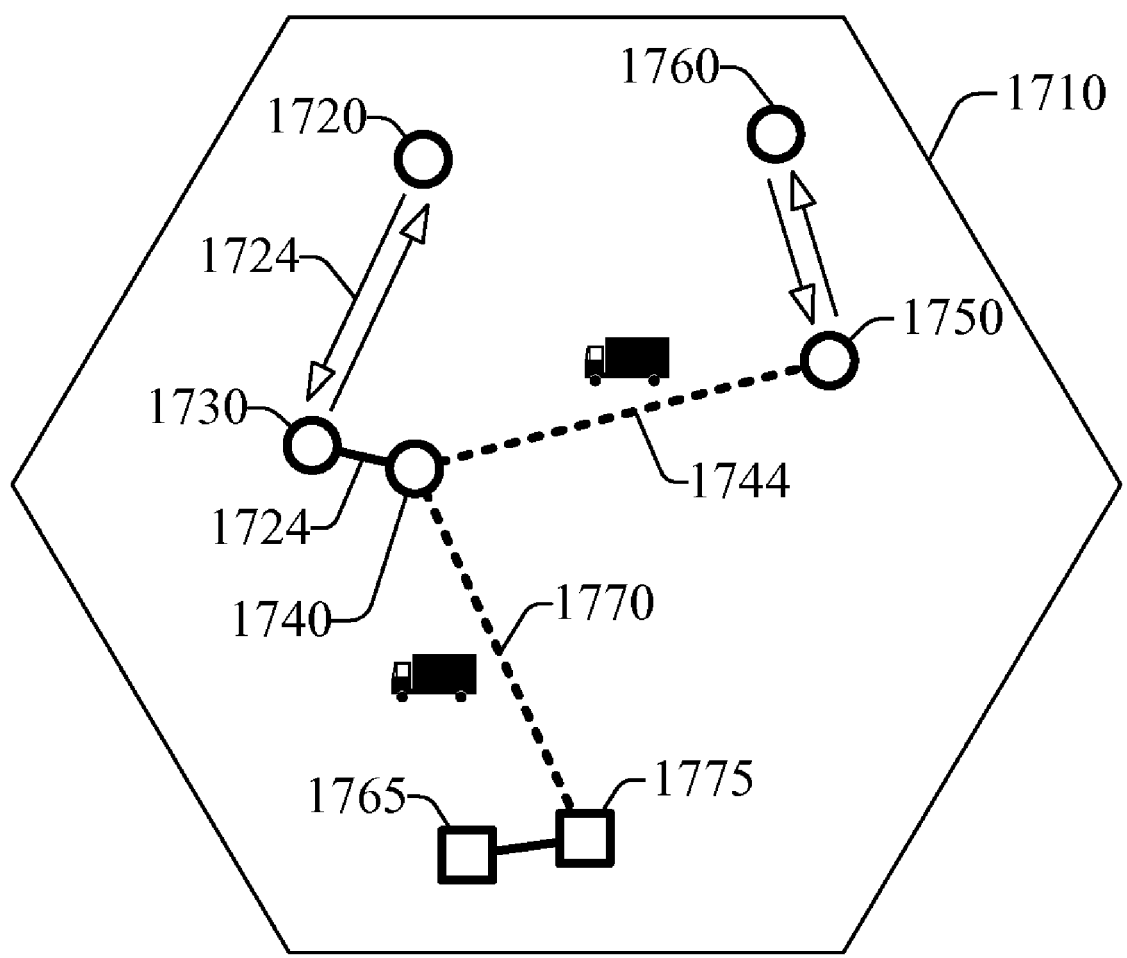
FIG. 17 illustrates an example of autonomously determined distribution steps, from design to manufacturing and to marketing, for an asset (e.g., a finished product, a partially finished product, . . . ).

FIG. 17 illustrates an example of autonomously determined distribution steps, from design to manufacturing and to marketing, for an asset (e.g., a finished product, a partially finished product, . . . ). The hexagonal cell 1710 represents a specific geographic area (e.g., a city, a county, a state, one or more countries) wherein two classes of autonomous tool conglomerates; e.g., "circular" conglomerates 1720, 1730, 1740, 1750, and 1760, and "square" conglomerates 1765 and 1775, participate in the manufacturing chain of a set of products, or assets. (It is to be noted that the geographical area can encompass substantially any bound area in addition to a hexagonal cell.) As an example scenario, and not by way of limitation, manufacturing of an asset starts at conglomerate 1720 which can be a conglomerate that provides design for custom-made solid state devices for optical management for high-mountain sports (e.g., skiing, climbing, paragliding, and so on). Design can consist in performing computational simulations of the optical properties of source materials and their combinations, as well as device simulation. In such an instance, conglomerate 1720 can be a massively parallel supercomputer which can be construed in the subject example as a set of autonomous tool groups (FIG. 12), wherein each computer in the network of simulation computers is considered an autonomous tool group. Conglomerate 1720 outputs a one or more designs of the optical device and a series of reports associated with description of the devices—e.g., a data asset. Such an output or asset (not shown), after appropriate encryption and packaging (e.g., through component), can be conveyed to conglomerate 1730 via a communication link 1724 which can be a wireless link.

Conglomerate 1730 can receive the data asset and, as a non-limiting example, initiates a deposition process to fabricate a solid-state device according to the received asset. To that end, conglomerate 1730 can partner with conglomerate 1740 and both can be regarded as fabrication facilities that are part of a two-conglomerate autonomous conglomerate tool 1310. Such conglomerates can produce multiple devices according to the received specification asset, once a device is fabricated it can be tested, and assigned a quality and performance metric, such metrics can lead to backward chaining to located "poor performers" among the autonomous tools that enter conglomerates 1730 and 1740. Through determination of multiple metrics, it is possible to autonomously adjust the operation of conglomerates 1720 and 1730 to optimize production of the device, or output asset. It is noted that link 1724 indicates an internal link, wherein conglomerates 1730 and 1740 are part of a same fabrication plant; thus the asset can be transported in substantially different conditions than when utilizing link 1724 which provides a vehicular transportation route. Link 1744 can be employed to ship devices for commercial packaging in a disparate geographic location (such transportation can be motivated by advantageous packaging costs, skillful labor, corporate tax incentives, and so on). It should be appreciated that an autonomous learning system at conglomerate 1740 can optimize the shipping times (via a scheduler, for example) and routes (e.g., link 1744) in order to ensure timely and cost effective delivery. At conglomerate 1750 assets are packed and remotely tested, via a wireless link, in conglomerate 1760. In an aspect, the volume of devices tested and the lots from which devices are tested can be determined by an autonomous system in conglomerate 1760. Once packed devices have been approved for commercialization, the assets are shipped through road link 1744 at conglomerate 1740, and subsequently shipped via road link 1770 to a disparate class of conglomerate 1775. Such conglomerate can be a partner vendor, and conglomerate 1775 can be storage warehouse, which can be considered a tool group conglomerate. Such conglomerate is linked, internally, to conglomerate 1765 which can be a showroom for the received assets.

In view of the example systems presented and described above, a methodology that may be implemented in accordance with the disclosed subject matter, will be better appreciated with reference to the flowchart of FIGS. 18, 19, and 20. While, for purposes of simplicity of explanation, the methodologies are shown and described as a series of blocks, it is to be understood and appreciated that the disclosed aspects are not limited by the number or order of acts, as some acts may occur in different orders and/or concurrently with other blocks from what is depicted and described herein. Moreover, not all illustrated acts may be required to implement the methodologies described hereinafter. It is to be appreciated that the functionality associated with the blocks may be implemented by software, hardware, a combination thereof or any other suitable means (e.g., device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 18 presents a flowchart of an example method 1800 for biologically based autonomous learning with contextual goal adjustment. At act 1810 a goal is established. A goal is an abstraction associated with a functionality of a goal component that is employed to accomplish the goal or objective. A goal can be multi-disciplinary and span various sectors (e.g., industrial, scientific, cultural, political, and so on). Generally act 1810 can be executed by an actor that can be external, or extrinsic, to a goal component that can be coupled to a learning system (e.g., adaptive inference engine). In view of the multidisciplinary nature of a goal, a goal component can be a tool, device, or system that possesses multiple functionalities; for instance, a tool system (e.g., tool system 310) that performs a specific process, or a device that provides with a specific outcome to a set of requests, or the like. At act 1820 data is received. Such data can be intrinsic, e.g., data generated in a goal component (e.g., component 120) that pursues a goal. In an aspect, as a part of performing the specific process, a set of sensors or probes associated with the tool can gather the data that is received in an adaptive intelligent component. Received data can also be extrinsic, such as data conveyed by an actor (e.g., actor 190), which can be a human agent or a machine. Extrinsic data can be data that is utilized to drive a process or, generally, to drive an accomplishment of a specific goal. A human agent can be an operator of the tool system, and can provide instructions or specific procedures associated with the processes performed by the tool. An example of an actor can be a computer performing a simulation of the tool system, or substantially any goal component. It should be appreciated that simulation of the tool system can be employed to determine deployment parameters for the tool system, or for testing alternative conditions of operation for the tool (e.g., conditions of operations that can pose a hazard to a human agent, or can be costly). The received data can be training data or production data associated with a specific process, or generally a specific code.

In a further aspect, the received data can be associated with data types or with procedural, or functional, units. A data type is a high level abstraction of actual data; for instance, in an annealing state in the tool system a temperature can be controlled at a programmed level during the span of the annealing cycle, the time sequence of temperature values measured by a temperature sensor in the tool system can be associated a sequence data type. Functional units can correspond to libraries of received instructions, or processing code patches that manipulate data necessary for the operation of the tool or for analyzing data generated by the tool. Functional units can be abstracted into concepts related to the specific functionality of the unit; for example, a multiplication code snippet can be abstracted into a multiply concept. Such concepts can be overloaded, in that a single concept can be made dependent on a plurality of data types, such as multiply(sequence), multiply (matrix), or multiply(constant, matrix). Moreover, concepts associated with functional units can inherit other concepts associated with functional units, like derivative(scalar_product(vector, vector)) which can illustrate a concept that represents a derivative of a scalar product of two vectors with respect to an independent variable. It should be appreciated that functional concepts are in direct analogy with classes, which are in themselves concepts. Furthermore, data types can be associated a priority and according to the priority can be deposited in a semantic network. Similarly, functional concepts (or autobots), can also be associated with a priority, and deposited in a disparate semantic network. Concept priorities are dynamic, and can facilitate concept activation in the semantic networks.

At act 1830 knowledge is generated from the received data, which can be represented in semantic networks, as discussed above. Generation of knowledge can be accomplished by propagating activation in the semantic networks. Such propagation can be determined by a situation score assigned to a concept in addition to a score combination. In an aspect, score combination can be a weighted addition of two scores, or an average of two or more scores. It should be appreciated that a rule for score combination can be modified as necessary, depending on tool system conditions or information input received from an external actor. It should be appreciated that a priority can decay as time progresses to allow concepts that are seldom activated to became obsolete, allowing new concepts to become more relevant.

The generated knowledge can be complete information; for instance, a steady-state pressure in a deposition step is a precise, well-defined mathematical function (e.g., a single-valued function with all parameters that enter the function deterministically assessed, rather than being stochastic or unknown) of two independent variables like steady-state flow and steady state exhaust valve angle. Alternatively, the generated knowledge can represent a partial understanding; for example, an etch rate can be possess a known functional dependence on temperature (e.g., an exponential dependence), yet the specific relationship—e.g., precise values of parameters that determine the functional dependence—between etch rate and temperature is unknown.

At act 1840 the generated knowledge is stored for subsequent utilization of for autonomous generation of further knowledge. In an aspect, knowledge can be stored in a hierarchy of memories. A hierarchy can be determined on the persistence of knowledge in the memory and the readability of knowledge for creation of additional knowledge. In an aspect, a third tier in the hierarchy can be an episodic memory (e.g., episodic memory 530), wherein received data impressions and knowledge can be collected. In such a memory tier manipulation of concepts is not significant, the memory acting instead as a reservoir of available information received from a tool system or an external actor. In an aspect, such a memory can be identified as a metadatabase, in which multiple data types and procedural concepts can be stored. In a second tier, knowledge can be stored in a short term memory wherein concepts can be significantly manipulated and spread activation in semantic networks can take place. In such a memory tier, functional units or procedural concepts operate on received data, and concepts to generate new knowledge, or learning. A first tier memory can be a long term memory (e.g., LTM 510) in which knowledge is maintained for active utilization, with significant new knowledge stored in this memory tier. In addition, knowledge in a long term memory can be utilized by functional units in short term memory.

At act 1850 the generated or stored knowledge is utilized. Knowledge can be employed to (i) determine a level of degradation of a goal component (e.g., tool system 310) by identifying differences between stored knowledge and newly received data (see self-awareness component 550), wherein the received data can be extrinsic (e.g., input 130) or intrinsic (e.g., a portion of output 140); (ii) characterize either extrinsic or intrinsic data or both, for example by identifying data patterns or by discovering relationships among variables (such as in a self-conceptualization component 560), wherein the variables can be utilized to accomplish the established goal; or (iii) generate an analysis of the performance of the tool system that generates the data (e.g., self-optimization component 570), providing indications of root cause for predicted failures or existing failures as well as necessary repairs or triggering alarms for implementing preventive maintenance before degradation of the tool system causes tool failure. It is to be noted that utilization of the stored and generated knowledge is affected by the received data—extrinsic or intrinsic—and the ensuing generated knowledge.

Act 1860 is a validation act in which the degree of accomplishment of a goal can be inspected in view of generated knowledge. In case the established goal is accomplished, example method 1800 can end. Alternatively, if the established goal has not been accomplished, the established goal can be reviewed at act 1870. In the latter, flow of method 1800 can lead to establishing a new goal in case a current goal is to be revised or adapted; for instance, goal adaptation can be based on generated knowledge. In case no revision of a current goal is to be pursued, flow of method 1800 is returned to generate knowledge, which can be utilized to continue pursuing the currently established goal.

FIG. 19 presents a flowchart 1900 of an example method for adjusting a situation score of a concept associated with a state of a goal component. At act 1910 a state of a goal component is determined. A state typically is established through a context, which can be determined by various data input (e.g., input 130), or through a network of concepts associated with the input and exhibiting specific relationships. The input data relates to a goal that is pursued by the goal component; for instance, a recipe for a coating process of a specific thin-film device can be deemed as input associated with a "deposit an insulating device" goal. At act 1920 a set of concepts that can be applied to the state of the goal component is determined. Such concepts can be abstractions of data types entered in act 1910, or can be existing concepts in a memory platform (e.g., long term memory 510, or short term memory 520). Generally, functional concepts that can act on descriptive concepts (e.g., concepts with no functional component) can be utilized more frequently towards achieving a goal. At act 1930 a situation score for each concept in a set of concepts associated with the goal state is determined. A set of situation scores can establish a hierarchy for concept utilization or application, which can determine the dynamics of a goal, like goal adaptation or sub-goal creation/randomization. Adjustment of situation scores for specific concepts can drive goal accomplishment as well as propagation within a space of goals as part of goal adaptation.

FIG. 20 presents a flowchart 2000 of an example method for generating knowledge through inference. At act 2010 a concept is associated to a data type and a priority for the concept is determined. Priorities typically can be determined based on a probability of utilization of a concept, or a concept's weight. Such a weight can be determined through a function (e.g., a weighted sum, or a geometric average) of parameters that can represent the ease to utilize a concept (e.g., the complexity to operate on a data type), such a parameter can be identified with a concept's inertia, and the suitability parameter of a concept to describe a state (e.g., a number of neighboring concepts that can be related the concept). It should be appreciated that a priority can be time dependent as a consequence of explicitly time-dependent inertia and suitability parameters, or as a result of concept propagation. Time dependent priorities can introduce aging aspects into specific concepts and thus can promote knowledge flexibility (e.g., knowledge (for example, a paradigm employed to pursue a goal, such as a recipe for preparation of a nano-structured device) through concepts ceasing to be relevant in a particular knowledge scenario (e.g., node structure in a priority-based knowledge network). At act 2020 a semantic network for a set of prioritized concepts is established. It should be appreciated that the semantic network can comprise multiple sub-networks, wherein each of the multiple networks can characterize a set of relationships among concepts in a class. As an example, in a two-tier semantic network, a first sub-network can represent relationships among concepts derived from data types, whereas a second sub-network can comprise relationships among functional concepts (e.g., a planner autobot or überbot, a conceptual autobot) describing operations that can be utilized to alter upon a data type. At act 2030 the set of priorities is propagated over the semantic network to make an inference and thus generate knowledge associated with the network of concepts. In an aspect, such propagation can be utilized to generate optimization plans for goal adaptation, or to predict failures in a system that pursues a specific goal.

FIG. 21 is a flowchart of an example method 2100 for asset distribution. Asset(s) can be provided by an individual autonomous tool, an autonomous group tool (e.g., system 1210), or an autonomous conglomerated tool system (e.g., system 1310). It should be appreciated that assets can be generated in alternative manners as well. At act 2110 an asset is received. In an aspect, the received asset can be an asset selected from output asset(s) generated by one or more autonomous tools. At act 2120 the received asset is processed for distribution. As discussed above, an asset typically carries advantages associated with knowledge utilized in generating the asset; thus, an asset can be packaged in such a manner that prevent a competitor to reverse-engineer the asset. It should be appreciated that depending on the destination of the asset, packaging information associated to the asset can be customized, delivering disparate levels of information based at least in part on whether the entity that receives the asset is a commercial partner, or a customer, or other branch, division, or group of an organization that fabricates the asset. The level of information packaged with the asset can follow specific policies (for example, policies stored in policy store 1692). Additionally, for data assets or computer program assets, such assets can be encrypted while being packaged in order retain integrity of the information conveyed by the asset. Moreover, part of the processing for distributing an asset can include retaining the asset in storage (e.g., asset store 1683) while a suitable distribution schedule is followed. In an aspect, such schedule can be optimized by an autonomous system (e.g., system 360) that supports a tools system the fabricates, or produces, the asset to be distributed.

At act 2130 the processed asset is distributed. Distribution typically depends on the asset features and characteristics, as well as on the destination of the asset. For example, assets can be distributed within a factory plant, in order to complete asset production like in an assembly line wherein an unfinished vehicle (e.g., an asset) can be transported through different stages of assembly. Similarly, in the food industry, a frozen meal (e.g., asset) is distributed throughout a food preparation plant. Alternatively, or in addition, depending on industry, an unfinished asset can be distributed to overseas to be finished in order to benefit from cost-effective production markets.

At act 2140, an distributed asset is monitored in order to ensure, for example, the asset distribution adheres to applicable distribution regulation, or to ensure adequate inventory replenishment by having access to distribution status of the asset. In addition, monitoring distribution of the asset can mitigate losses and damages, as well as can facilitate interaction with commercial partners and customers.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A semiconductor tool system, comprising:
a processor;
a computer-readable storage medium communicatively coupled to the processor and storing computer executable components comprising:
a learning system configured to:
receive data that pertains to a set of tools utilized to fabricate a product; and
backward chain through the data to rank at least one tool in the set of tools in accord with degradation of the product to generate knowledge to facilitate an increase in product yield.

2. The system of claim 1, wherein the knowledge generated comprises a mean time between failures of the at least one tool in the set of tools.

3. The system of claim 1, wherein the knowledge generated comprises a mean time to repair the at least one tool in the set of tools.

4. The system of claim 1, wherein the knowledge further comprises a prediction of failure of at least one part comprising the at least one tool.

5. The system of claim 4, wherein the learning system is further configured to utilize an expected time to failure of the at least one part comprising the at least one tool to optimize a parts inventory pertaining to the at least one part comprising the at least one tool.

6. The system of claim 1, wherein the optimized fabrication of the product the knowledge further comprises learning to predict a prediction of a set of factors for ramp up associated with an increase in rate of performance which affect product fabrication.

7. The system of claim 6, further comprising optimizing wherein the prediction facilitates selection of the set of factors associated with an increase in rate of performance.

8. The system of claim 1, wherein the set of tools are associated with a product asset, the product asset comprises a recipe for at least a portion of a process associated with fabrication of the product.

9. The system of claim 1, wherein the set of tools are associated with a product asset, the product asset comprises a set of observed data associated with measurements conducted on the product.

10. The system of claim 9, wherein the observed data includes at least one of an index of refraction, an absorption coefficient, or a critical dimension.

11. The system of claim 9, wherein the product asset further comprises a set of metrics computed from the observed data.

12. The system of claim 11, wherein the set of computed metrics includes at least one of a mean value, a standard deviation value, or a uniformity value.

13. The system of claim 1, wherein the set of tools are associated with a product asset, the product asset comprises at least a partially processed solid state semiconductor material.

14. A method comprising:
receiving data pertaining to quality of a product, wherein the data is further associated with a plurality of tools involved in fabricating the product;
identifying, by backward chaining through the data, degradation in the quality of the product; and
ranking at least one tool, in the plurality of tools, regarding an effect of the at least one tool on the quality of the product.

15. The method of claim 14, further comprising monitoring the data facilitating determining of the effect of the at least one tool on a future quality of the product.

16. The method of claim 14, further comprising encrypting the data.

17. The method of claim 14, further comprising scheduling a distribution time for the data.

18. A computer-readable storage medium having computer executable instructions stored thereon that, in response to execution by a processor, cause the processor to perform operations for semiconductor processing, the operations comprising:
receiving data pertaining to quality of a product, wherein the data is further associated with a plurality of tools involved in fabricating the product; and
generating a knowledge facilitating an increase in product yield, wherein the generating further comprises:
identifying, by backward chaining through the data, degradation in quality of the product; and
ranking at least one tool, in the plurality of tools, regarding an effect of the at least one tool on the quality of the product.

19. The system of claim 1, further comprising an autonomous learning system associated with the at least one tool in the set of tools.

20. The system of claim 19, wherein the autonomous learning system comprises a memory platform configured to store operation knowledge pertaining to operation of the at least one tool, wherein the memory platform includes a hierarchy of memories.

21. The system of claim 20, wherein the hierarchy of memories includes at least one of a long term memory, a short term memory, or an episodic memory.

22. The system of claim 20, wherein the autonomous learning system further comprises a platform configured to process the data, wherein the platform includes a set of functional units configured to operate on the data.

23. The system of claim 22, further comprising a knowledge network configured to facilitate communication among the hierarchy of memories in the memory platform, the set of functional units in the platform that, or a combination thereof.

24. The system of claim 22, wherein the set of functional units includes a memory platform and a platform that processes data.

25. The system of claim 22, wherein the set of functional units includes at least one unit configured to identify a degradation condition for the at least one tool in the set of tools.

26. The system of claim 25, wherein the degradation condition pertains to at least one difference between a set of features in a first fabrication process and a second fabrication process.

27. The system of claim 25, wherein the degradation condition includes a numeric value, the numeric value assesses a distance amongst two vectors of N tuples, wherein the N tuples are computed metrics of observed data and N is a positive integer.

28. The system of claim 27, wherein the numeric value is a Euclidean distance.

29. The system of claim 27, wherein the numeric value includes a cosine similarity metric.

30. A semiconductor tool system, comprising:
a processor:
a computer-readable storage medium communicatively coupled to the processor and storing computer executable components comprising:
a learning system configured to:
receive data that pertains to a set of tools utilized to fabricate a product; and
backward chain, in the event of degradation in the quality of the product, through the data to rank at least one tool in the set of tools to generate knowledge to facilitate an increase in efficiency of the semiconductor tool system.

* * * * *